United States Patent

Siegrist

[15] 3,697,513

[45] Oct. 10, 1972

[54] HETEROCYCLIC COMPOUNDS CONTAINING ETHYLENE DOUBLE BONDS AND PROCESSES FOR THEIR MANUFACTURE

[72] Inventor: Adolf Emil Siegrist, Basel, Switzerland

[73] Assignee: Ciba-Geigy AG, Basel, Switzerland

[22] Filed: April 16, 1968

[21] Appl. No.: 721,593

[30] Foreign Application Priority Data

April 21, 1967 Switzerland...............5735/67

[52] U.S. Cl. .......260/240 R, 106/193 D, 117/33.5 R, 117/138.8 D, 117/138.8 E, 117/138.8 F, 117/138.8 N, 117/144, 162/162, 252/301.2 W, 260/37 P, 260/38, 260/39 P, 260/40 R, 260/40 TN, 260/41 C, 260/240 CA, 260/240 D, 260/240 E, 260/327 R, 260/327 B, 260/329 R, 260/330.5, 260/332.3 R, 260/332.5, 260/340.3, 260/340.6, 260/346.1 R, 260/346.2 R, 260/346.2 M, 260/347.8, 260/566 D, 260/566 F

[51] Int. Cl. ............................................C07d 63/18

[58] Field of Search................260/240 CA, 240 D, 260/240R, 240E

[56] References Cited

OTHER PUBLICATIONS

Siegrist, Helv, Chim. Acta. Vol. 50, pages 906 to 911 (1967), (published April 20, 1967).
Katayanagi, J. Pharm. Soc. Japan, Vol. 68, pages 232 to 234 (1948).
Chemical Abstracts, Vol. 48, Cols. 4545 to 4546 (1954), (abstract of Katayanagi).

Primary Examiner—Henry R. Jiles
Assistant Examiner—G. Thomas Todd
Attorney—Harry Goldsmith, Joseph G. Kolodny, Bryant W. Brennan and Edward J. Sites

[57] ABSTRACT

The invention refers to a class of new compounds as well as a new process for making these compounds. The new compounds correspond to the general formula

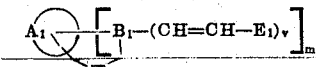

wherein $A_1$ represents a heterocyclic ring system which (a) contains at least one five-membered to six-membered heterocyclic ring having at least one ring oxygen atom and/or one ring sulphur atom, (b) is free of ring nitrogen atoms and of hydrogen atoms which are replaceable by alkali metal, and (c) is bonded by a ring carbon atom to a ring carbon atom of $B_1$, or has two adjacent ring carbon atoms in common with two adjacent ring carbon atoms of $B_1$, and wherein furthermore (a) $B_1$ denotes a benzene ring or a heterocyclic ring of aromatic character containing five to six ring members, with these rings being permitted to contain further condensed-on aromatic, heterocyclic or hydroaromatic five-membered to six-membered rings, but preferably only one such ring, and (b) $v$ denotes an integer from 1 to 2, and (c) wherein $m$ denotes an integer from 1 to 4 in the case of a single bond between $A_1$ and $B_1$, and denotes the numbers 1 or 2 in the case of rings $A_1$ and $B_1$ being condensed with one another, and wherein $E_1$ represents an aromatic carbocyclic or heterocyclic rings system containing five to six ring members, which may contain further condensed-on aromatic or hydroaromatic ring system of carbocyclic or heterocyclic nature, and may contain aromatic, araliphatic, cycloaliphatic, aliphatic or other non-chromophoric substituents, with the exception of methyl groups, which are capable of carbanion formation in the presence of alkali metal ions.

39 Claims, No Drawings 3,697,513

HETEROCYCLIC COMPOUNDS CONTAINING ETHYLENE DOUBLE BONDS AND PROCESSES FOR THEIR MANUFACTURE

The compounds of this invention are useful as optical brighteners (formula 33), those having short-wave absorbing properties are particularly useful as scintillators, ultraviolet absorbers or for electrophotographic purposes, whereas those having long-wave absorbing properties are useful for preparing fluorescent dyeings.

The novel process for the preparation of these compounds comprises reacting a compound of the formula

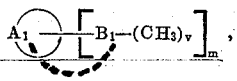

wherein $A_1$, $B_1$, $v$ and $m$ have the same significances as given above, in the presence of a strongly basic alkali compound with a Schiff base, and a strongly polar, neutral to basic organic solvent is to be used as the reaction medium which (I) is free of atoms, especially hydrogen atoms, which are replaceable by alkali metal, and (II) should be practically anhydrous, and in the case where alkali hydroxides are used as the strongly basic alkali compound, these alkali hydroxides may have a water content of up to 25%.

The present invention comprises a process for the manufacture of heterocyclic compounds containing at least one ethylene double bond conjugated with a carbocyclic aromatic six-membered ring. This process is characterized in that a compound of formula (1) 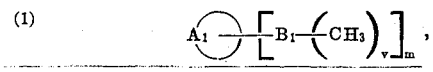

wherein $A_1$ represents a heterocyclic ring system which (a) contains at least one five-membered to six-membered heterocyclic ring having at least one ring oxygen and/or one ring sulphur atom, (b) is free of ring nitrogen atoms and of hydrogen atoms which are replaceable by alkali metal, and (c) is bonded by a ring carbon atom to a ring carbon atom of $B_1$ or has two adjacent ring carbon atoms in common with two adjacent ring carbon atoms of $B_1$, and wherein furthermore (a) $B_1$ denotes a benzene ring or a heterocyclic ring of aromatic character containing five to six ring members, and this ring may contain further condensed-on aromatic, heterocyclic or hydroaromatic five-membered to six-membered rings, but preferably only one such ring, and (b) $v$ denotes an integer from 1 to 2, and $c$) wherein $m$ denotes an integer from 1 to 4 in the case of a single bond between $A_1$ and $B_1$ and denotes the numbers 1 or 2 in the case of rings $A_1$ and $B_1$ being condensed with one another, are reacted with a Schiff base in the presence of a strongly basic alkali compound, with the reaction medium to be used being a strongly polar neutral to basic organic solvent which I) is free of atoms, especially hydrogen atoms, which are replaceable by alkali metal, and II) should be practically anhydrous, and with, in the case where alkali hydroxides are used as the strongly basic alkali compound, these alkali hydroxides being permitted to have a water content of up to 25 %.

In the majority of cases the compounds which are reacted in accordance with the above reaction are those which contain one methyl group per ring system $B_1$, that is to say compounds of formula (2) 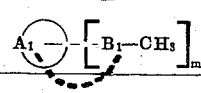

wherein $A_1$ represents a heterocyclic ring system which (a) contains at least one five-membered to six-membered heterocyclic ring having at least one ring oxygen and/or ring sulphur atom, (b) is free of ring nitrogen atoms and of hydrogen atoms which are replaceable by alkali metal, and (c) is bonded by a ring carbon atom to a ring carbon atom of $B_1$ or has two adjacent ring carbon atoms in common with two adjacent ring carbon atoms of $B_1$, and wherein furthermore $B_1$ (a) denotes a benzene ring or a heterocyclic ring of aromatic character containing five to six ring members, where this ring may contain further condensed-on aromatic, heterocyclic or hydroaromatic five-membered to six-membered rings, but preferably only one such ring, and (b) the methyl group according to the general formula is, in the case of a single bond between $A_1$ and $B_1$, in the para-position to this single bond, and is, in the case of condensed ring systems $A_1$ and $B_1$, in the meta-position to the carbon atom of $B_1$ which is directly bonded to a ring oxygen atom or a ring sulphur atom of the ring system $A_1$, and (c) wherein $m$ denotes an integer from 1 to 4 in the case of a single bond between $A_1$ and $B_1$ and denotes the numbers 1 or 2 in the case of rings $A_1$ and $B_1$ being condensed with one another.

The principal variants of the present process may be circumscribed as follows:

I. The reaction of an aldehyde-anil with a compound of formula (3) 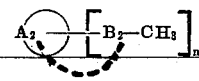

wherein $A_2$ represents a heterocyclic ring system which (a) contains a five-membered to six-membered heterocyclic ring having at least one ring oxygen and/or ring sulphur atom, (b) is free of ring nitrogen atoms and of hydrogen atoms which are replaceable by alkali metal, (c) is bonded by a ring carbon atom to a ring carbon atom of $B_2$ or has two adjacent ring carbon atoms in common with two adjacent ring carbon atoms of $B_2$, and wherein furthermore $B_2$ represents a benzene residue which (a) may contain a condensed-on further benzene residue or a condensed-on heterocyclic five-membered to six-membered ring of aromatic character, and (b) whose methyl group according to the above formula is, in the case of a single bond between $A_2$ and $B_2$, in the para-position to this single bond, and is, in the case of condensed ring systems between $A_2$ and $B_2$, in the meta-position to the carbon atom of $B_2$ which is directly bonded to a ring oxygen atom or a ring sulphur atom of the ring system $A_2$, and (c) wherein $n$ represents the numbers 1 or 2, in an anhydrous strongly polar neutral basic organic solvent in the presence of a strong alkaline potassium compound.

II. The reaction of an aldehyde-anil with a compound of formula (4) 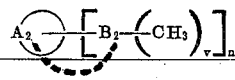

wherein $A_2$ represents a heterocyclic ring system which (a) contains a five-membered to six-membered heterocyclic ring of aromatic character having one to two ring oxygen or ring sulphur atoms, (b) is free of ring nitrogen atoms and of hydrogen atoms which are replaceable by alkali metal, and (c) is bonded by a ring carbon atom to a ring carbon atom of $B_2$ or has two adjacent ring carbon atoms in common with two adjacent ring carbon atoms of $B_2$, wherein furthermore $B_2$ represents a benzene residue and both $v$ and also $n$ represent the numbers 1 or 2, and wherein furthermore, in the case of a single bond between $A_2$ and $B_2$, one of the methyl groups is preferably in the para-position to this single bond, and in the case of condensed ring systems between $A_2$ and $B_2$ is in the meta-position to the carbon atom of $B_2$ which is directly bonded to a ring oxygen atom or a ring sulphur atom of the ring system $A_2$, in an anhydrous strongly polar neutral to basic organic solvent in the presence of a strongly alkaline potassium compound.

III. The reaction of an anil of an aldehyde of aromatic character with a compound which corresponds to the formula (5) 

wherein $D_1$ denotes an aromatic, heterocyclic, cycloaliphatic, araliphatic or aliphatic non-chromophoric residue which is (a) free of hydrogen atoms which are replaceable by alkali metal and (b) should be free of methyl groups, the symbol

represents a 5-membered to 6-membered ring system which (a) may be bonded both to $D_1$ and to $B_3$ by a single bond, (b) may form condensed ring systems with both $D_1$ and $B_3$, (c) may form a condensed ring system with one of the residues $D_1$ or $B_3$ whilst the other residue is bonded by a single bond, and (d) together with $B_3$ (I) either contains at least one conjugated double bond in the case of linkage by a single bond, or (II) in the case of condensed ring systems has a double bond in common with the condensed-on ring, and wherein, in this ring system, X denotes a bridge member —O— or —S— and Y represents a member X or a direct bond and the remaining ring members are formed by carbon atoms, $B_3$ represents an optionally substituted benzene residue whose methyl group indicated in the formula is, in the case of the benzene residue linked by a single bond, in the para-position to this bond and, in the case of a condensed benzene residue, in the meta-position to the carbon atom of the benzene residue $B_3$ which is directly bonded to a ring oxygen atom or a ring sulphur atom of the condensed-on ring system

and wherein $p$ represents an integer from 1 to 3 and $q$ represents the numbers 1 or 2 and the sum $p+q$, in the case where both $D_1$ and $B_3$ are condensed with the ring system,

represents at most the number 3, and in the case where only one of the two residues $D_1$ or $B_3$ is in a condensed form, represents at most the number 4.

According to the above definition there are to be understood, by the heterocyclic ring systems $A_1$, $A_2$ and

with the conditions of formulas (1) or (2) given under (a) and (b), such hetero-rings as contain the ring oxygen and ring sulphur atoms mentioned in general in a bivalent arrangement which is in itself known, that is to say as —S— or —O— bridge members, with these bridge members being separated from one another by at least one ring carbon atom. Normally these hetero-rings contain one to two such bridge members, it being possible for either two —S— bridge members or two —O— bridges or one —S— and one —O— bridge to be present. Heterocyclic rings having either one —S— bridge or one —O— bridge are preferentially considered. Where two hetero-atom bridges are present, the 1,4-position deserves emphasis in the case of six-membered rings.

The ring member $B_1$ may, as can be seen, also represent a heterocyclic aromatic ring system which contains not only oxygen and sulphur atoms but also nitrogen atoms as heteroatoms As may be seen from the reaction scheme (see below) the ring system $B_1$ as well as the corresponding ring systems $B_2$ and $B_3$ should, apart from the methyl group defined by the general formulas, of course be free of hydrogen atoms replaceable by alkali metal to the same extent as the ring system $A_1$ and/or $A_2$, $D_1$ and

As regards the residue $D_1$ defined under formula (5) it should be explained that here the term "aliphatic residue" is not only intended to be understood to include, for example, alkyl, alkenyl or alkoxy groups but also, in the broadest sense, all other non-aromatic residues provided they (a) do not have any chromophoric character and (b) are free of hydrogen atoms which are replaceable by alkali metal. Halogen atoms, nitrile groups and sulphonyl groups may be mentioned as examples thereof.

As regards the aromatic, heterocyclic and cycloaliphatic residues cited under "$D_1$" it should be noted that these residues are above all represented by five-membered to six-membered ring systems and may, as can be seen from the formula, be bonded to the ring system

by a single bond. In the case of condensed ring systems of $D_1$ with

$D_1$ preferably denotes a single five-membered to six-membered aromatic, heterocyclic or hydroaromatic ring.

The ring system

may finally, if free positions remain available, contain further substituents which meet the requirements explained above (and which in particular do not contain any hydrogen atoms replaceable by alkali metal).

As regards the Schiff base which functions as the reaction partner, and as regards the reaction conditions, it should be added that in most cases in practice the compounds defined in formula (1) are reacted in an anhydrous strongly polar neutral to weakly basic solvent in the presence of a strong alkaline potassium compound, with an aldehyde-anil as the Schiff base.

The reaction discovered in the present process depends, in principle, on a reaction of the methyl group of compounds of formula type (1) with the azomethine grouping of a Schiff base (for example benzalaniline) with elimination of the amine component, as can be represented by the following scheme for the case of the reaction of only one methyl group.

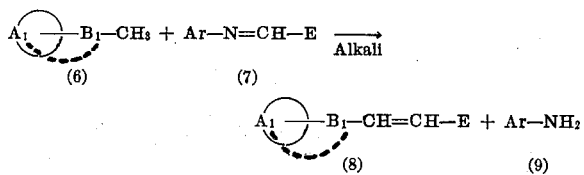

Herein $A_1$ and $B_1$ have the significance given above, Ar represents the residue of an amine, preferably of aromatic character (such as for example the phenyl residue in the case of the aniline) and E is defined as further stated below.

The following most important classes of compounds may be mentioned for the reaction partner containing reactive methyl groups according to formula (1), which is to be reacted with an anil of an aldehyde of aromatic character in accordance with the invention:

A. Compounds of formula (10)

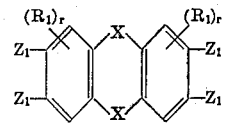

wherein X denotes a bridge member —O— or —S—, $Z_1$ represents a hydrogen atom, a methyl group or a residue $R_1$, with however at least one of the symbols $Z_1$ denoting a methyl group which is in the meta-position to one of the symbols X, and $R_1$ denotes hydrogen or a non-chromophoric substituent which is free of hydrogen atoms which are replaceable by alkali metal, or two symbols $R_1$ in the ortho-position may together form a carbocyclic condensed-on six-membered ring, and r denotes the numbers 1 or 2.

B. Compounds of formula (11)

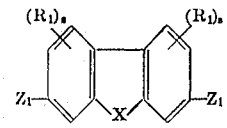

wherein X represents a bridge member —O— or —S— and $Z_1$ represents a hydrogen atom, a methyl group or a residue $R_1$, but at least one of the symbols $Z_1$ represents a methyl group, $R_1$ denotes hydrogen or a non-chromophoric substituent which is free of hydrogen atoms which are replaceable by alkali metal or two symbols $R_1$ in the ortho-position can together form a carbocyclic condensed-on six-membered ring, and s denotes an integer from 1 to 3.

C. Compounds of formula (12)

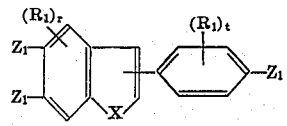

wherein X denotes a bridge member —O— or —S—, $R_1$ denotes hydrogen or a non-chromophoric substituent which is free of hydrogen atoms which are replaceable by alkali metal, or two symbols $R_1$ in the ortho-position may together form a carbocyclic, condensed-on six-membered ring, $Z_1$ represents a hydrogen atom, a methyl group or a residue $R_1$, but at least one of the symbols $Z_1$ represents a methyl group, and methyl groups in the condensed ring system should be in the meta-position to a bridge member —O— or —S—, and r represents the number 1 or 2 and t represents an integer from 1 to 4.

D. Compounds of formula (13)

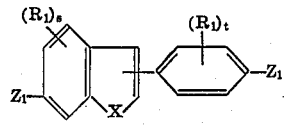

wherein $Z_1$ represents a hydrogen atom, a methyl group or a residue $R_1$ but at least one of the two symbols $Z_1$ represents a methyl group, $R_1$ denotes hydrogen or a non-chromophoric substituent which is free of hydrogen atoms which are replaceable by alkali metal, or two symbols $R_1$ in the ortho-position may together form a carbocyclic condensed-on six-membered ring, X represents a bridge member —O— or —S—, s denotes an integer from 1 to 3 and t denotes an integer from 1 to 4. In this formula the ring containing the hetero-atom X may optionally also further contain a substituent $R_1$.

E. Compounds of formula (14)

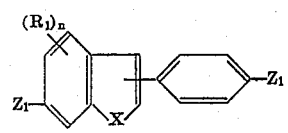

wherein X represents a bridge member —O— or —S—, $Z_1$ represents a hydrogen atom, a methyl group or a residue $R_1$ but at least on of the two symbols $Z_1$ represents a methyl group, $R_1$ denotes hydrogen, halogen, an alkyl or alkoxy group containing 1 to 4 carbon atoms, a benzyl group or a phenyl group or two symbols $R_1$ in the ortho-position may together form an aromatic, carbocyclic condensed-on six-membered ring, and n denotes an integer from 1 to 2.

F. Compounds of formula

(15) 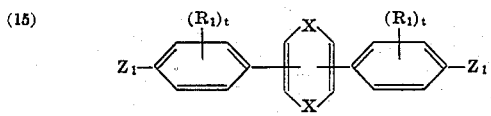

wherein X denotes a bridge member —O— or —S— and $Z_1$ represents a hydrogen atom, a methyl group or a residue $R_1$, but at least one of the two symbols $Z_1$ represents a methyl group, $R_1$ denotes hydrogen, alkyl, alkoxy, phenyl or halogen, or two symbols $R_1$ in the ortho-position may together form a carbocyclic condensed-on six-membered ring, and $t$ represents an integer from 1 to 4. In this formula the ring containing the hetero-atoms X may optionally also further contain a substituent $R_1$.

G. Compounds of formula

(16) 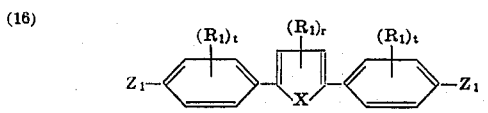

wherein X denotes a bridge member —O— or —S—, $Z_1$ represents hydrogen, a methyl group or a residue $R_1$, with however at least one of the symbols $Z_1$ representing a methyl group, $R_1$ denotes hydrogen, alkyl, alkoxy, phenyl or halogen, or two symbols $R_1$ in the ortho-position may together form a carbo-cyclic condensed-on six-membered ring, t represents an integer from 1 to 4 and r denotes the number 1 or 2.

H. Compounds of formula

(17) 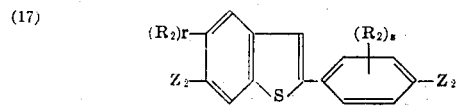

wherein $Z_2$ denotes a hydrogen atom or a methyl group but at least one of the two symbols $Z_2$ represents a methyl group, $R_2$ denotes a hydrogen atom, a phenyl group, an alkyl group containing two to 12 carbon atoms, an alkoxy group containing one to four carbon atoms or a halogen atom, with r representing the numbers 1 or 2 and s representing the numbers 1, 2 or 3, and with the sum r+s, in the case of substituents different from hydrogen, amounting to not more than four, and with furthermore a maximum of two phenyl substituents being permitted to be present. The thienyl ring in the above formula may optionally further contain an alkoxy group (one to four carbon atoms), a halogen atom or a phenyl group.

I. Compounds of formula

(18) 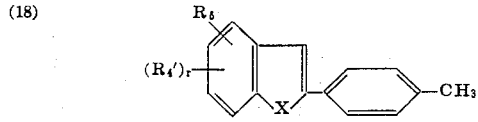

wherein $R_4'$ denotes a hydrogen atom, an alkyl group containing one to four carbon atoms, an alkoxy group containing one to four carbon atoms or halogen, and two adjacent residues $R_4'$ may together form a condensed-on benzene ring, $R_5$ denotes hydrogen, methyl, phenyl or benzyl, r represents the numbers 1 or 2 and X represents a bridge member —O— or —S—. At the same time a residue $R_4'$ is preferably in positions 5 or 6 of the benzothiophene or benzofurane ring, respectively.

K. Compounds of formula

(19) 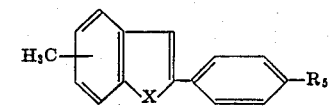

wherein $R_5$ represents hydrogen or phenyl and the methyl group given in the formula is preferably in positions 5 or 6 of the benzothiophene or benzofurane ring respectively, and X represents a bridge member —O— or —S—.

L. Compounds of formula

(20) 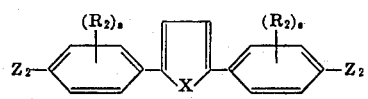

wherein $Z_2$ denotes a hydrogen atom or a methyl group, but at least one of the two symbols $Z_2$ represents a methyl group, X represents a bridge member —O— or —S—, $R_2$ denotes a hydrogen atom, a phenyl group, an alkyl group containing two to 12 carbon atoms, an alkoxy group containing one to four carbon atoms or a halogen atom, and s represents the numbers 1, 2 or 3.

M. Compounds of formula

(21) 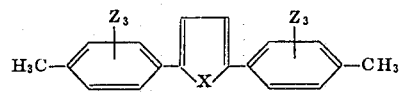

wherein the symbols $Z_3$ either both denote hydrogen or both represent a methyl group and X represents a bridge member —O— or —S—.

N. Compounds of formula

(22) 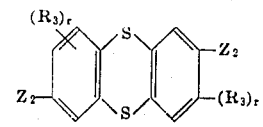

wherein $Z_2$ denotes a hydrogen atom or a methyl group but at least one of the two symbols $Z_2$ represents a methyl group, $R_3$ represents a hydrogen atom, a halogen atom, an alkyl group containing two to four carbon atoms or a phenyl group, and r represents the numbers 1 or 2.

O. Compounds of formula

(23) 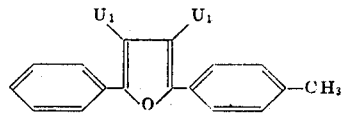

wherein $U_1$ represents a hydrogen atom, a phenyl group, an alkyl group containing two to four carbon atoms, an alkoxy group containing one to four carbon atoms or a halogen atom.

P. Compounds of formula

(24) 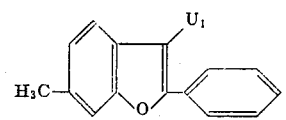

wherein $U_1$ represents a hydrogen atom, a phenyl group, an alkyl group containing two to four carbon atoms, an alkoxy group containing one to four carbon atoms or a halogen atom.

Q. Compounds of formula

(25) 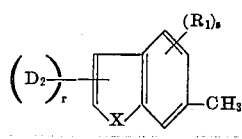

wherein $D_2$ denotes a non-chromophoric aromatic, heterocyclic, cycloaliphatic or araliphatic residue containing one to two ring systems having 5 to 6 ring members each, or a non-chromophoric aliphatic residue which is free of hydrogen atoms which are replaceable by alkali metal, and $R_1$ denotes hydrogen or a non-chromophoric substituent which is free of hydrogen atoms which are replaceable by alkali metal, or two symbols $R_1$ in the ortho-position may together from a carbo-cyclic condensed-on six-membered ring, X denotes a bridge member —O— or —S—, r represents the number 1 or 2 and s an integer from 1 to 3.

R. Compounds of formula

(26) 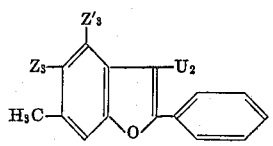

wherein $U_2$ represents hydrogen or phenyl and either both of the symbols $Z_3$ and $Z_3'$ denote hydrogen or one of the two symbols $Z_3$ and $Z_3'$ represents the methyl group whilst the other denotes hydrogen.

The Schiff base to be used as a second reaction partner in the present process must, as is obvious, be free of reactive methyl groups, for example those in the p-position to the azomethine grouping. The possible Schiff bases in turn represent the (known) condensation products of aldehydes of aromatic character with primary amines (of aliphatic, aromatic or heterocyclic nature), whose amino group is bonded to a tertiary carbon atom. Compounds of this type may accordingly be written as azomethine compounds of formula

(27) 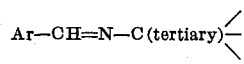

with Ar denoting an aromatic residue. At the same time either one or both of the components required for the synthesis of the Schiff bases (aldehyde and amine) may contain further substituents, providing the above restriction is observed. Since the amine residue, especially the aniline residue, is split off during the reaction and is no longer present in the end product, the presence of substituents is here generally not indicated and uninteresting. Nevertheless however substituents which do not interfere with, or hinder, the reaction, for example chlorine atoms, may also be present in this ring. The benzene residue bonded to the =HC— group may for example carry halogen atoms such as bromine or chlorine or alkoxy groups such as methoxy or ethoxy. Preferential interest attaches to Schiff bases of aromatic aldehydes with anilines, that is to say aromatic aldehyde-anils. Such anils for example correspond to the formula

(28) 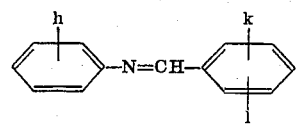

where $k$ and $l$ may be identical or different and denote hydrogen atoms, chlorine atoms or methoxy group, and $h$ represents chlorine or preferentially hydrogen. Adjacent $k$ and $l$ may together also form a —O—CH$_2$—O— group. A further important variant of aromatic anils corresponds to the formula

(29) 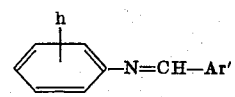

wherein $h$ (as above) represents a hydrogen atom or chlorine and Ar' denotes a naphthyl or diphenyl residue. Practical importance above all attaches to the variant according to which a compound of formula

(30) 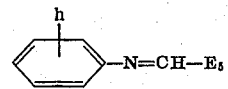

is used as the Schiff base, wherein $h$ represents hydrogen or chlorine and $E_5$ represents phenyl, naphthyl, diphenyl, thienyl or a phenyl residue which may be substituted by halogen, alkyl groups containing one to four carbon atoms, alkoxy groups containing one to four carbon atoms, alkylamino groups containing one to four carbon atoms or methylenedioxy groups. The following may be mentioned by way of examples of suitable monoaldehydes for the synthesis of these Schiff bases: aldehydes of the benzene series such as benzaldehyde or its halogenated analogues, such as monochloro- and dichloro-analogues, alkoxybenzaldehydes such as p-methoxy-benzaldehyde, alkylated benzaldehydes, to the extent that they do not contain any p-methyl groups, such as toluyl-aldehyde, xylyl-aldehyde, or cumoyl-aldehyde, methylenedioxy-benzaldehyde-(piperonal), 4-dimethylamino-benzaldehyde, 4-diethylamino-benzaldehyde or diphenyl-aldehyde; aldehydes of the naphthalene series such as α- and β-naphthaldehyde, and heterocyclic aldehydes such as for example furfurol and thiophene-aldehyde.

The anilines, naphthylamines or, as aliphatic representatives, tert. butylamine may for example be mentioned as suitable amines.

The compounds of formula (1) are reacted with the aldehyde-anils in the presence of a strongly polar neutral to alkaline organic solvent which is free of atoms, especially hydrogen atoms, which are replaceable by alkali metals. Such solvents are especially represented by dialkylated acylamides, preferably those of the type $$[(\text{Alkyl})_2 N]_w\text{—Acyl} \qquad (31)$$

wherein "alkyl" denotes a lower alkyl group (containing one to four carbon atoms), especially a methyl group, "acyl" represents the residue of a lower carboxylic acid (containing one to four carbon atoms), especially formic acid or acetic acid, or of phosphoric acid, and w indicates the basicity of the acid. As important representatives of such solvents there may be mentioned: dimethylformamide, diethylformamide dimethylacetamide and hexamethyl-phosphoric acid triamide. Solvent mixtures can also be considered.

A strongly basic alkali compound is furthermore required for the reaction. Under strongly basic alkali compounds there are to be understood, within the framework of the present invention, those compounds of the alkali metals (I. Main group of the periodic system of the elements) including ammonium, which has a base strength of at least approximately that of lithium hydroxide. Accordingly, they may be compounds of lithium, sodium, potassium, rubidium, caesium or ammonium of the type of, for example, the alcoholates, hydroxides, amides, hydrides or sulphides, or strongly basic ion exchangers. Preferentially (above all if mild reaction conditions as regards the reaction temperature appear to be indicated), potassium compounds of the composition $$KOC_{m-1}H_{2m-1} \quad (32)$$

are used, wherein m represents an integer from 1 to 6, such as for example potassium hydroxide or potassium tertiary-butylate. In the case of alkali alcoholates and alkali amides (and hydrides) it is at the same time necessary to work in a practically anhydrous medium, whilst in the case of alkali hydroxides water contents of up to 25 % (for example contents of water of crystallization) are permitted. In the case of potassium hydroxide a water content of up to about 15 % has proved appropriate. As examples of other alkali compounds which may be used, sodium methylate, sodium hydroxide, sodium amide, lithium amide, lithium hydroxide, rubidium hydroxide, caesium hydroxide and the like may be mentioned. It is of course also possible to work with mixtures of such bases.

An embodiment of the present invention which is of practical importance consists, according to the preceding explanations, of reacting anils of aldehydes of the benzene and naphthalene series with compounds of formulas (1) to (5) and (10) to (26) and so on, with this reaction being carried out in the presence of an alkali compound having a base strength at least equal to that of lithium hydroxide, preferably potassium tertiary-butylate or potassium hydroxide, in a solvent corresponding to the formula

$$[(Alkyl)_2 N]_w\text{—Acyl} \quad (31)$$

wherein "alkyl" denotes a lower alkyl group, "acyl" denotes the residue of a lower aliphatic carboxylic acid or the phosphoric acid and w denotes the basicity of the acid, preferably in dimethylformamide.

It is appropriate to react the compounds of formula (1) with the aldehyde-anils in equivalent quantities, so that no significant excess of either component is present. If several methyl groups are to be reacted, it is preferable to work with an excess of up to about 50 mol percent of the anil component. As regards the alkali compound, it is advantageous to use at least the equivalent quantity, that is to say at least 1 mol of a compound having for example one KO group per one mol of aldehyde-anil. When using potassium hydroxide, the four-fold to eight-fold quantity is preferentially employed.

The reaction according to the invention can generally be carried out at temperatures within the range of between about 10° and 150° C. If alcoholates are used as the potassium compound in the reaction, it is in general necessary to apply heat. The procedure followed is for example to add the aldehyde-aniline to the mixture of the compound of formula (1), the solvent and the potassium alcoholate, appropriately with stirring and with exclusion of air, at a temperature of between 15° and 30° C, whereupon the reaction takes place without difficulty at 30° to 90° C. When using potassium hydroxide it is frequently necessary to work at a higher temperature. For example, the reaction mixture is slowly warmed to 40° – 100° C and is then kept at this temperature for some time, for example for ½ to 2 hours. The final substances may be worked up from the reaction mixture according to usual methods which are in themselves known.

The heterocyclic compounds obtainable according to the process of the invention are novel. They may be represented by the general formulas given below:

Compounds of formula (33)

wherein $A_1$ represents a heterocyclic ring system which (a) contains at least one five-membered to six-membered heterocyclic ring having at least one ring oxygen and/or one ring sulphur atom, (b) is free of ring nitrogen atoms and of hydrogen atoms which are replaceable by alkali metal, and (c) is bonded by a ring carbon atoms to a ring carbon atom of $B_1$, or has two adjacent ring carbon atoms in common with two adjacent ring carbon atoms of $B_1$, and wherein furthermore (a) $B_1$ denotes a benzene ring or a heterocyclic ring of aromatic character containing five to six ring members, and these rings may contain further condensed-on aromatic, heterocyclic or hydroaromatic five-membered to six-membered rings, but preferably only one such ring, and (b) v denotes an integer from 1 to 2 and (c) wherein $m$, in the case of a single bond between $A_1$ and $B_1$, denotes an integer from 1 to 4, and in the case of rings $A_1$ and $B_1$ condensed with one another denotes the numbers 1 or 2, and wherein $E_1$ represents an aromatic carbocyclic or heterocyclic ring system containing five to six ring members, which may contain further condensed-on aromatic or hydroaromatic ring systems of carbocyclic or heterocyclic nature, and may contain aromatic, araliphatic, cycloaliphatic, aliphatic or other non-chromophoric substitutents, with the exception of methyl groups, which are capable of carbanion formation in the presence of alkali metal ions.

Compounds of formula (34)

wherein $A_1$, $B_1$ and m have the same significance as given under formula (2) and wherein furthermore the —CH=CH— group according to the above formula in the case of a single bond between $A_1$ and $B_1$ is in the para-position to this single bond and in the case of condensed ring systems $A_1$ and $B_1$ is in the meta-position to the carbon atom of $B_1$ which is directly bonded to a ring oxygen atom or ring sulphur atom of the ring system $A_1$, and $E_1$ represents an aromatic carbo-cyclic or heterocyclic ring system containing five to six ring members, which may contain further condensed-on aromatic or hydroaromatic ring systems of carbocyclic or heterocyclic nature and may contain aromatic, araliphatic, cycloaliphatic aliphatic or other non-chromophoric substituents, with the exception of methyl groups, which are capable of carbanion formation in the presence of alkali metal ions.

Compounds of general formula

(35) 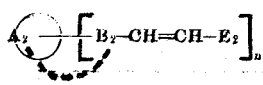

wherein $A_2$, $B_2$ and n have the same significance as given under formula (3) and the —CH=CH—group according to the above formula in the case of a single bond between $A_2$ and $B_2$ is in the para-position to this single bond, and in the case of condensed ring systems between $A_2$ and $B_2$ is in the meta-position to the carbon atom of $B_2$ which is directly bonded to a ring oxygen atom or a ring sulphur atom of the ring system $A_2$, and $E_2$ represents a benzene, pyridyl, thienyl or furyl residue which may contain further condensed-on aromatic or hydroaromatic ring systems of carbocyclic or heterocyclic nature and may contain aromatic, araliphatic, cycloaliphatic or aliphatic or other non-chromophoric substituents, with the exception of methyl groups, which are capable of carbanion formation in the presence of alkali metal ions.

Compounds of formula

(36) 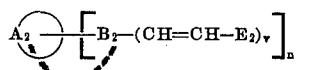

wherein $A_2$ represents a heterocyclic ring system which a) contains a five-membered to six-membered heterocyclic ring of aromatic character having one to two ring oxygen or ring sulphur atoms, (b) is free of ring nitrogen atoms and of hydrogen atoms which are replaceable by alkali metal, and (c) is bonded by a ring carbon atom to a ring carbon atom of $B_2$ or has two adjacent ring carbon atoms in common with two adjacent ring carbon atoms of $B_2$, wherein furthermore $B_2$ represents a benzene residue and both $v$ and also $n$ represent the numbers 1 or 2, and wherein furthermore in the case of a single bond between $A_2$ and $B_2$ one of the —CH=CH—$E_2$— groups is preferably in the para-position to this single bond, and in the case of a condensed ring system between $A_2$ and $B_2$ is in the meta-position to the carbon atom of $B_2$ which is directly bonded to a ring oxygen atom or ring sulphur atom of the ring system $A_2$, and wherein $E_2$ denotes a phenyl, naphthyl, diphenyl or thienyl residue which may further contain halogen, alkyl, alkoxy, aminoalkyl, cycloalkyl or methylenedioxy groups as substituents, with the exception of methyl groups which are capable of carbanion formation in the presence of alkali metal ions.

Compounds of general formula

(37) 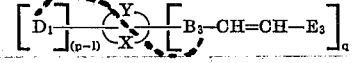

wherein $D_1$, $B_3$, X, Y as well as the symbol

and $p$ as well as $q$ have the same significance as given under formula (5), the —CH=CH— group given in this formula in the case of the benzene residue being linked by a single bond is in the para-position to this bond and in the case of a condensed benzene residue is in the meta-position to the carbon atom of the benzene residue $B_3$ which is directly bonded to a ring oxygen atom or a ring sulphur atom of the condensed-on ring system

and wherein $E_3$ represents a benzene, thienyl or furyl residue which may contain aromatic, araliphatic, cycloaliphatic or aliphatic or other non-chromophoric substituents with the exception of methyl groups, which are capable of carbanion formation in the presence of alkali metal ions.

Compounds of formula

(38) 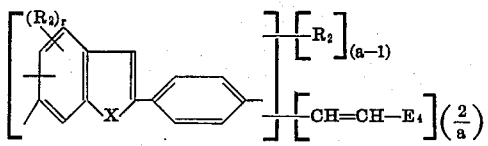

wherein $R_2$ denotes a hydrogen atom, a phenyl group, an alkyl group containing two to 12 carbon atoms, an alkoxy group containing one to four carbon atoms or a halogen atom, wherein $r$ represents the numbers 1 or 2 and furthermore at most one phenyl substituent may be present, wherein $E_4$ denotes a phenyl, naphthyl or thienyl residue which may contain further substituents of the group of halogen, alkyl, alkoxy having one to 18 carbon atoms each, phenyl (optionally substituted) as well as a condensed-on hydroaromatic carbo-cyclic six-membered ring or methylenedioxy ring, a denotes the integers 1 or 2 and X represents a bridge member —O— or —S—.

Compounds of formula

(39) 

wherein $R_2$, $r$ and $s$ have the significance given under formula (17),$E_4$ denotes a phenyl, naphthyl or thienyl residue which may contain further substituents of the group of halogen, alkyl, alkoxy or alkylamino with one to 18 carbon atoms in each case, phenyl (optionally substituted) as well as a condensed-on hydroaromatic, carbocyclic six-membered ring or methylenedioxy ring, and a denotes the integers 1 or 2.

Compounds of formula (40)

wherein $R_4$ denotes hydrogen, an alkyl group containing one to four carbon atoms, an alkoxy group containing one to four carbon atoms or halogen, $R_5$ denotes hydrogen, methyl, phenyl or benzyl, r represents the numbers 1 or 2, $E_5$ denotes phenyl, naphthyl, diphenylyl, thienyl or a phenyl residue which may be substituted by halogen, alkyl groups containing one to four carbon atoms, alkoxy groups containing one to four carbon atoms or methylenedioxy groups, and X represents a bridge member —O— or —S—.

Compounds of formula

(41) 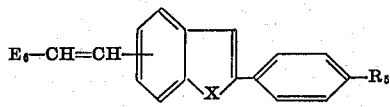

wherein $R_5$ represents hydrogen or phenyl and $E_6$ denotes phenyl, naphthyl, diphenylyl or a phenyl residue which may be substituted by halogen, alkoxy groups containing one to four carbon atoms, or methylenedioxy groups, and X represents a bridge member —O— or —S—. The residue $E_6$—CH=CH— of the above formula is preferably in positions 5 or 6 of the benzothiophene ring or benzofurane ring respectively.

Compounds of formula

(42) 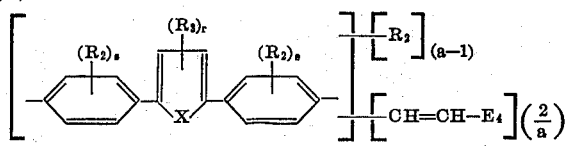

wherein $R_2$, $R_3$, r and s have the significance given above under formula (20) and $E_4$ as well as a have the significance given under formula (39).

Compounds of formula

(43) 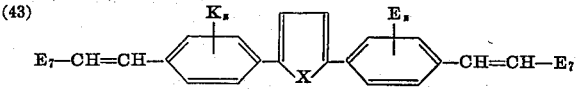

wherein $E_7$ denotes a phenyl or naphthyl group, or a phenyl group which is substituted by alkyl groups or alkoxy groups containing one to four carbon atoms, $E_z$ represents hydrogen or —CH=CH—$E_7$ and X denotes a bridge member —O— or —S—.

Compounds of formula

(44) 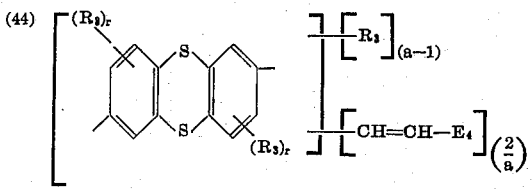

wherein $R_3$, r, $E_4$ and a have the significance given under formulas (22) and (39).

Compounds of formula

(45) 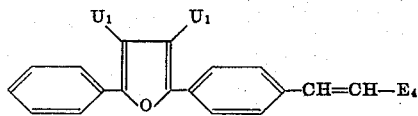

wherein $E_4$ has the significance given under formula (39) and $U_1$ represents a hydrogen atom, a phenyl group, an alkyl group containing 2 to 4 carbon atoms, an alkoxy group containing one to four carbon atoms or a halogen atom.

Compounds of formula

(46) 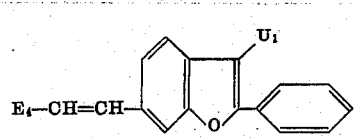

wherein $E_4$ has the significance given under formula (39) and $U_1$ has the significance given under formula (45).

Compounds of formula

(47) 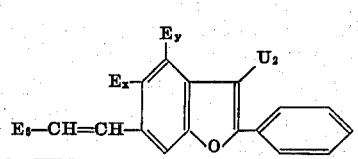

wherein $U_2$ represents hydrogen or phenyl, $E_6$ denotes phenyl, diphenylyl, naphthyl or a phenyl group substituted by alkoxy groups containing one to four carbon atoms, $E_x$ and $E_y$ either both denote hydrogen or one of the symbols $E_x$ and $E_y$ represents a group $E_6$—CH=CH— whilst the other denotes hydrogen.

Compounds of formula

(48) 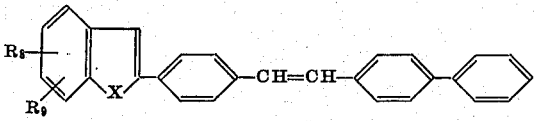

wherein X denotes a bridge member —O— or —S—, $R_8$ represents hydrogen, alkyl with one to four carbon atoms, halogen, alkoxy with one to four carbon atoms, benzyl or phenyl and $R_9$ represents hydrogen or a methyl group.

Compounds of formula

(49) 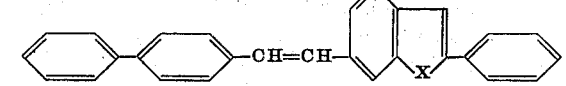

wherein X denotes a bridge member —O— or —S—.

Amongst the large number of non-chromophoric substituents $R_1$, as mentioned in several of the above formulas, halogen, alkyl groups, alkoxy groups, cycloalkyl groups, aralkyl groups, phenyl groups, hydroxyl groups, amino groups, carboxyl groups and sulphonic acid groups as well as their substitutive and functional derivatives may be mentioned by way of example as being for practical purposes of predominant interest. At the same time it will be obvious that those non-chromophoric substituents which do not satisfy the requirements according to the definitions, especially formulas (1), (2), (4) and (5), must be excluded from the starting substances according to formula (10) and subsequent formulas, while they can certainly be present in the reaction end products according to formula (33) and subordinate formulas if they have subsequently been introduced according to methods which are in themselves known. By substitutive or functional derivatives of such groups, as designated above, there are to be understood (as examples): halogenalkyl, hydroxyalkyl, cyanalkyl, carboxyalkyl and phenylalkyl groups; carboxylic acid esters, amides, halides, nitriles, hydrazides or the sulphonic acid analogues; alkoxy, aralkoxy, phenoxy and hydroxyalkoxy groups; alkylated, arylated, and acylated amino groups; amino groups substituted by 1,3,5-triazinyl residues and the like.

The new compounds of formulas (33) to (49) may serve as intermediates for syntheses of the most diverse kind, for example for the manufacture of dyestuffs and pharmaceuticals.

The said new compounds may be modified by the introduction of further substituents according to methods which are in themselves known, for example the introduction of sulphonic acid groups (and their functional derivatives such as esters and amides) by sulphonation, the introduction of chloromethyl groups, oxidation of methyl groups, halogenations and the like. For certain fields of application (optical brighteners) the introduction of groups which confer water solubility (sulphonic acid groups, carboxyl groups, and alcoholic hydroxyl groups) may especially be of importance.

A large number of compounds of general formula (33) and subordinate formulas may, as has furthermore been found, be used as optical brighteners provided they do not contain any chromophoric groups.

The types of compounds in the preceding text which deserve particular emphasis as regards their brightening action above all correspond to the formulas (38), (40), (41), (47), (48) and (49). They possess a more or less pronounced fluorescence in the dissolved or finely divided state. They are suitable for the optical brightening of the most diverse organic material of natural or synthetic origin, and of materials containing such organic substances, for which optical brightening can be considered. As such materials, there may for example be mentioned the following groups of organic materials, without the recital which follows being in any way intended to express a limitation thereon:

I. Synthetic organic high molecular materials such as
A. Polymerization products based on organic compounds containing at least one polymerizable carbon-carbon double bond (homopolymers or copolymers as well as their post-treatment products such as cross-linking, grafting or degradation products, polymer dilutions and the like), for which the following may be mentioned by way of examples: polymers based on α, β-unsaturated carboxylic acids (for example acrylic compounds), on olefine hydrocarbons, on vinyl and vinylidene compounds, on halogenated hydrocarbons, on unsaturated aldehydes and ketones, allyl compounds and the like; furthermore polymerization products such as are obtainable by ring opening (for example polyamides of the polycaprolactam type), and furthermore formaldehyde polymers, or polymers which are obtainable both by polyaddition and by polycondensation, such as polythioethers, polyacetals, and thioplastics.
B. Polycondensation products or pre-condensates based on bifunctional or polyfunctional compounds having groups capable of condensation, their homocondensation and co-condensation products, as well as post-treatment products (for example polyesters, saturated and unsaturated, unbranched or branched), polyamides, maleate resins, their pre-condensates and products of analogous structure, polycarbonates, silicone resins, and others.
C. Polyaddition products such as polyurethanes (crosslinked and uncrosslinked), and epoxide resins.

II. Semi-synthetic organic materials such as for example cellulose esters, nitrocellulose, cellulose ethers, regenerated cellulose or their post-treatment products, and casein plastics.

III. Natural organic materials of animal or vegetable origin, for example based on cellulose or proteins such as wool, cotton, silk, leather, wood compositions in a finely divided form, natural resins, and furthermore rubber, guttapercha, balata as well as their post-treatment products and modification products.

The organic material in question may be in the most diverse processing conditions (raw materials, semi-finished goods or finished goods) and states of aggregation. They may on the one hand be in the form of structures of the most diverse shapes, for example as sheets, profiles, injection mouldings, chips, granules or foams; films, foils, lacquers, bands, coverings, impregnations and coatings or filaments, fibers, flocks, bristles and wires. The said materials may on the other hand also be present in unshaped states, in the most diverse homogeneous and inhomogeneous forms of division and states of aggregation, for example as powders, solutions, emulsions, dispersions, sols, gels, putties, pastes, waxes, adhesives and filling compositions and the like.

Fibrous materials may for example be in the form of endless filaments, staple fibers, flocks, ropes, yarns, threads, fiber fleeces, felts, waddings, flocked structures, woven textile fabrics or laminates, knitted fabrics as well as papers, cardboard or paper compositions and the like.

To act as brighteners, these compounds may be added to the materials mentioned before or during shaping. Thus they may for example be added to the moulding composition during the manufacture of films or other shaped articles, or dissolved, dispersed or otherwise finely divided in the spinning composition before spinning. The optical brighteners may also be added to the starting substances, reaction mixtures or intermediates for the manufacture of fully synthetic or semi-synthetic organic materials, thus also before or during the chemical reaction, for example in the case of a polycondensation, a polymerization or a polyaddition.

The new optical brighteners may of course also be employed in all those cases where organic materials of the nature indicated above are combined with inorganic materials in any form. They are distinguished by particularly good heat stability, light fastness and resistance to migration.

The amount of the new optical brighteners to be used, relative to the material to be optically brightened, may vary within wide limits. A clear and durable effect can already be achieved with very small quantities, in certain cases for example quantities of 0.001 % by weight. However amounts of up to about 0.5 % by weight and above may also be employed. For most practical purposes, quantities between 0.01 and 0.2 % by weight are preferably of interest.

The compounds which serve as optical brighteners may for example also be employed as follows:

a. Mixed with dyestuffs or pigments, or as an additive to dye baths, printing pastes, discharge pastes or reserve pastes. Furthermore also for the post-treatment of dyeings, prints of discharge prints.

b. Mixed with so-called "carriers", anti-oxidants, light protection agents, heat stabilizers or chemical bleaching agents, or as an additive to bleaching baths.

c. Mixed with cross-linking agents, finishing agents such as starch or synthetically available finishes.

d. In combination with detergents, with the detergents and brighteners possibly being separately added to the wash baths to be used, or preferably with detergents being used which contain the brighteners admixed thereto.

e. In combination with polymeric carriers (polymerization, polycondensation or polyaddition products) in which the brightener is contained in a dissolved or dispersed form, optionally alongside other substances.

f. As additives to the most diverse industrial products in order to make these more marketable or to avoid disadvantages in their usability, for example as an additive to glues, adhesives, paints etc.

The compounds which have been emphasized as optical brighteners can also be used as scintillators, and for various purposes of a photographic nature, such as for electro-photographic reproduction or for supersensitization.

The significance of the columns in the tables which follow below is as follows: Column I = formula number; Column II = structural elements; Column III = melting points (uncorrected) in °C; Column IV = UV-absorption in dimethylformamide with principal maximum in the long-wave range.

EXAMPLE 1

5.6 g of 2-(p-tolyl)-benzothiophene of formula (101)

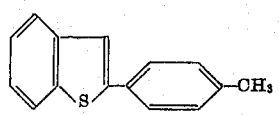

5.4 g of the anil of benzaldehyde and p-chloraniline and 12.5 g of potassium hydroxide powder containing about 10 % of water are stirred in 150 ml of dimethylformamide with exclusion of air, whereupon a reddish-violet color gradually arises. The temperature is brought to 60° C over the course of 30 minutes, and the mixture stirred for a further 30 minutes at 60° to 65° C and then cooled to room temperature. 50 ml of water and 130 ml of 10 % strength aqueous hydrochloric acid are now successively added dropwise. The precipitated reaction product is washed with a large amount of water and thereafter with 250 ml of methanol and dried: 7.5 g (96.2 % of theory) of 2-(stilben-4'-yl)-benzothiophene of formula (102)

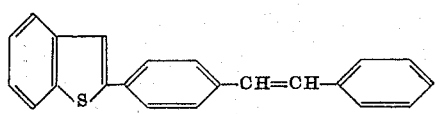

in the form of a pale yellow powder, melting point 290° to 291° C. Threefold recrystallization from xylene with the aid of Fuller's earth yields 3.4 g (43.6 % of theory) of pale greenish-tinged yellow fine crystals of melting point 294° to 294.5° C.

Analysis: $C_{22}H_{16}S$. Calculated: C 84.58, H 5.16, S 10.26; found: C 84.85, H 5.33, S 9.97.

UV-absorption in dimethylformamide: $\lambda_{max}$: 356 nm, $\epsilon \cdot 10^{-4}$: 5.76.

The stilbenyl-benzothiophene derivatives of formula (103)

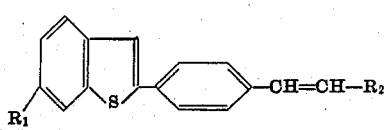

listed in the following table can be manufactured in a similar manner.

| I | II | | III | IV | |
|---|---|---|---|---|---|
| | $R_1$ | $R_2$ | | $\lambda$ | $\epsilon \cdot 10^{-4}$ |
| 104 | H | —⌬—Cl | 314–315 | 358 | 5.84 |
| 105 | H | —⌬—OCH₃ | 308.5–309.5 | 362 | 5.92 |
| 106 | H | —⌬—⌬ | 353–354 | 367 | 7.00 |
| 107 | H | —⌬—N(C₂H₅)₂ | 241–242 | 398 | 4.72 |
| 108 | H | naphthyl | 206–206.5 | 362 | 5.04 |
| 109 | H | thienyl | 278 | 367 | 5.20 |
| 110 | —CH₃ | —⌬ | 310–311 | 358 | 5.76 |
| 111 | —CH₃ | —⌬—Cl | 330–331 | 361 | 6.16 |
| 112 | —CH₃ | —⌬—OCH₃ | 325–326 | 365 | 6.12 |
| 113 | —CH₃ | —⌬—⌬ | 366–367 | 370 | 7.40 |
| 114 | —CH₃ | naphthyl | 210.5–211.5 | 368 | 5.00 |

EXAMPLE 2

5.6 of 2-(p-tolyl)-benzothiophene of formula (101), 4.55 g of benzalaniline and 12.5 g of potassium hydroxide powder containing about 10 % of water are stirred with 150 ml of dimethylformamide with exclusion of air, warmed to 60° C over the course of 30 minutes and stirred for a further 1 hour at 60° to 65° C. The mixture is worked up in accordance with the data of example 1: 7.5 g (96.2 % of theory) of 2-(stilben-4'-yl)-benzothiophene of formula (102), of melting point 292.5° to 293° C. After threefold recrystallization from xylene: 4.4 g (56.4 % of theory) of pale greenish-tinged yellow fine crystals of melting point 294° to 294.5° C.

The stilbenyl-benzothiophene derivatives of formula (115)

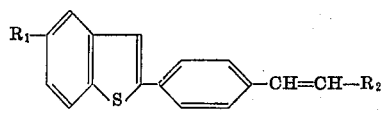

listed in the table which follows can be manufactured in a similar manner.

| I | II R₁ | II R₂ | III λ | IV ε·10⁻⁴ |
|---|---|---|---|---|
| 116 | H | —⟨◯⟩—F | 305–306 | 354 | 6.00 |
| 117 | H | —⟨◯⟩ with Cl | 254–255 | 357 | 5.80 |
| 118 | H | —⟨◯⟩—CH(CH₃)₂ | 287–288 | 358 | 6.16 |
| 119 | H | —⟨◯⟩ methylenedioxy | 287–277 | 366 | 5.92 |
| 120 | H | —naphthyl | 308–309 | 365 | 6.90 |
| 121 | —CH₃ | —⟨◯⟩ | 286–287 | 357 | 5.80 |
| 122 | —CH₃ | —⟨◯⟩—CH(CH₃)₂ | 291–292 | 359 | 6.08 |
| 123 | —CH₃ | —⟨◯⟩—OCH₃ | 300–301 | 364 | 6.08 |
| 124 | —CH₃ | —⟨◯⟩—⟨◯⟩ | 355–356 | 368 | 7.40 |
| 125 | —CH₃ | —naphthyl | 198.5–199 | 364 | 4.96 |

| I | II R₁ | II R₂ | III λ | IV ε·10⁻⁴ |
|---|---|---|---|---|
| 126 | —CH₃ | —naphthyl | 300–301 | 367 | 6.90 |
| 127 | —Cl | —⟨◯⟩ | 293–294 | 356 | 6.00 |
| 128 | —Cl | —⟨◯⟩—Cl | 227 | 358 | 6.44 |
| 129 | —Cl | —⟨◯⟩—OCH₃ | 319.5–320.5 | 364 | 6.00 |
| 130 | —Cl | —⟨◯⟩—CH(CH₃)₂ | 306.5–307.5 | 359 | 6.32 |
| 131 | —Cl | —⟨◯⟩—⟨◯⟩ | 352–353 | 368 | 7.30 |
| 132 | —Cl | —naphthyl | 212–213 | 364 | 5.05 |
| 133 | —Cl | —naphthyl | 347–348.5 | 366 | 6.95 |

EXAMPLE 3

5.6 g of 6-methyl-2-phenyl-benzothiophene of formula (134)

5.4 g of the anil of benzaldehyde and p-chloraniline and 11.2 g of potassium tertiary-butylate are stirred with 150 ml of anhydrous dimethylformamide with exclusion of air, whereupon a violet clear solution is produced. The temperature is brought to 90° C over the course of 30 minutes, and the mixture stirred for a further 30 to 60 minutes at 90° to 95° C and thereafter cooled to room temperature. 100 ml of water and 60 ml of 10 % strength aqueous hydrochloric acid are now successively added dropwise. The precipitated reaction product is washed with a large amount of water and thereafter with 500 ml of methanol and is dried: 6.5 g (83.3 % of theory) of 6-styryl-2-phenyl-benzothiophene of formula (135)

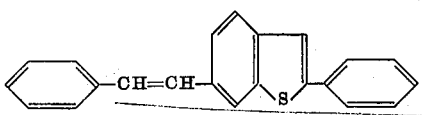

in the form of a yellow powder, melting point 241° to 242° C. Threefold recrystallization from tetrachlorethylene (active charcoal) yields 3.6 g (46.1 % of theory) of pale greenish-tinged yellow glistening fine crystals of melting point 243° to 244° C.

Analysis: $C_{22}H_{16}S$. calculated: C 84.58, H 5.16, S 10.26; found: C 84.19, H 5.25, S 10.35.

UV-absorption in dimethylformamide: $\lambda_{max}$: 354 nm, $\epsilon \cdot 10^{-4}$: 5.36.

The 6-styryl-2-phenyl-benzothiophene derivatives of formula (136)

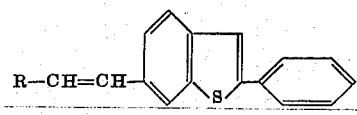

listed in the table which follows can be manufactured in a similar manner.

| I | II R | III λ | IV ε·10⁻⁴ |
|---|---|---|---|
| 137 | —⌬—OCH₃ | 261–262 | 362 5.92 |
| 138 | —⌬—⌬ | 296–297 | 367 7.00 |

If instead of the 11.2 g of potassium tertiary-butylate 12.5 g of potassium hydroxide powder containing about 10 % of water are used and the reaction is carried out for one hour at 90° to 95° C, then the compounds of formula (136) listed in the table which follows can be obtained.

| I | II R | III λ | IV ε·10⁻⁴ |
|---|---|---|---|
| 139 | —⌬—Cl | 286–287 | 358 5.44 |
| 140 | (naphthyl) | 187–187.5 | 365 4.72 |
| 141 | (naphthyl) | 293–294 | 365 6.25 |

EXAMPLE 4

5.6 g of 5-methyl-2-phenyl-benzothiophene of formula (142)

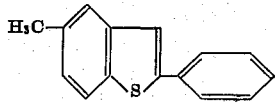

4.6 g of benzalaniline and 5.6 g of potassium tertiary-butylate are reacted in 150 ml of dimethylformamide for 60 minutes in accordance with the information in Example 3: 5.4 g (69.2 % of theory) of 5-styryl-2-phenyl-benzothiophene of formula (143)

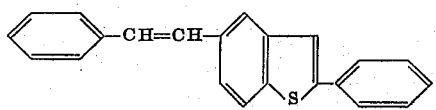

in the form of a light yellow powder, melting point 215° to 216° C. Double recrystallization from xylene (active charcoal) yields 3.1 g (40.4 % of theory) of almost colorless glistening platelets and small needles of melting point 240° to 241° C.
Analysis: $C_{22}H_{16}S$. calculated C 84.58, H 5.16, S 10.26; found: C 84.54, H 5.14, S 10.27.
UV-absorption in dimethylformamide: $\lambda_{max}$: 314, $\epsilon \cdot 10^{-4}$: 6.16.

The 5-styryl-2-phenyl-benzothiophene derivatives of formula (144)

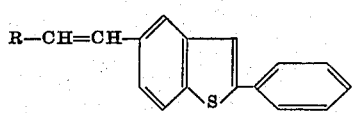

listed in the table which follows can be manufactured in a similar manner.

| I | II R | III λ | IV ε·10⁻⁴ |
|---|---|---|---|
| 145 | —⌬—OCH₃ | 254–255 | 326 5.85 |
| 146 | —⌬—⌬ | 288–289 | 329 6.70 |
| 147 | —⌬—O\CH₂/O (methylenedioxy) | 232.5–234.5 | 328 3.72 |
| 148 | —⌬—N(C₂H₅)₂ | 184.5–185 | 367 4.56 |

EXAMPLE 5

7.51 g of 6-methyl-2-biphenylyl-benzothiophene of formula (149)

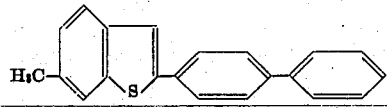

9.1 g of benzalaniline and 11.2 g of potassium tertiary-butylate are reacted in 300 ml of dimethylformamide for 60 minutes according to the information in Example 3; 9.4 g (96.9 % of theory) of 6-styryl-2-biphenylyl-benzothiophene of formula (150)

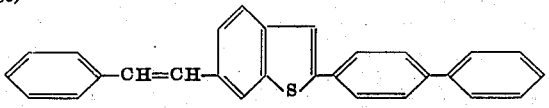

as a light yellow powder, melting point 299° to 300° C. Double recrystallization from o-dichlorobenzene (active charcoal) yields 7.7 g of light greenish-tinged yellow very fine crystals of melting point 311° to 312° C.
Analysis: $C_{28}H_{20}S$. calculated: C 86.56, H 5.19, S 8.25; found: C 86.16, H 5.06, S 8.49.
UV-absorption in dimethylformamide: $\lambda_{max}$: 366 nm, $\epsilon \cdot 10^{-4}$: 6.70.

The 6-styryl-2-biphenylyl derivatives of formula (151)

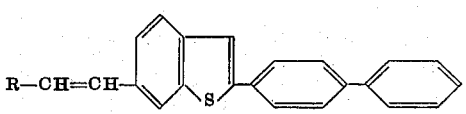

listed in the table which follows can be manufactured in a similar manner.

| I | II R | III λ | IV ε·10⁻⁴ |
|---|---|---|---|
| 152 | —⌬—CH(CH₃)₂ | 298.5–299.5 | 368 6.70 |

| I | II | III | IV |
|---|---|---|---|
| | R | λ | ε·10⁻⁴ |
| 153 | 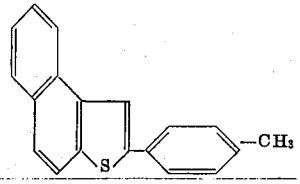 —OCH₃ | 307–308 | 372 | 6.75 |
| 154 | (2-naphthyl) | 280.5–281.5 | 373 | 5.70 |

EXAMPLE 6

3.43 g of 2-(p-tolyl)-naphtho-1',2':4,5-thiophene of formula (155)

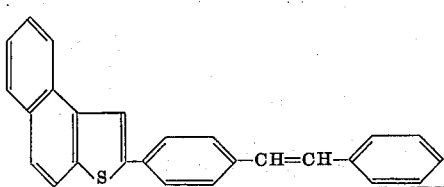—CH₃

2.3 g of benzalaniline and 6.25 g of potassium hydroxide powder containing about 10 % of water are reacted in 100 ml of dimethylformamide for 1 hour at 90° to 95° C in accordance with the information of Example 2: 4.2 g (93.4 % of theory) of 2-(stilben-4'-yl)-naphtho-1',2':4,5-thiophene of formula (156)

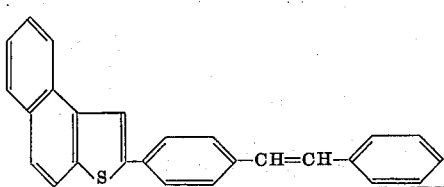—CH=CH—⬡ as a light greenish-tinged yellow powder of melting point 238° to 239° C. Threefold recrystallization from xylene (active charcoal) yields 3.6 g (80.1 % of theory) of light greenish-tinged yellow felted small needles of melting point 238° to 239° C.
Analysis: $C_{26}H_{18}S$. calculated: C 86.15, H. 5.01, S 8.85; found: C 86.27, H 5.04, S 9.00
UV-absorption in dimethylformamide: $\lambda_{max}$: 370 nm, $\epsilon \cdot 10^{-4}$: 6.10.

The stilbenyl-naphtho-thiophene derivatives of formula (157)

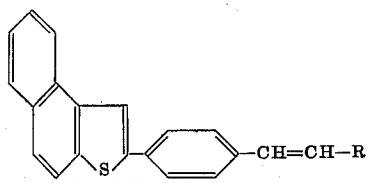—CH=CH—R listed in the table which follows can be manufactured in a similar manner.

| I | II | III | IV |
|---|---|---|---|
| | R | λ | ε·10⁻⁴ |
| 158 | —⬡—OCH₃ | 264–265 | 376 | 6.40 |
| 159 | —⬡—⬡ | 302–303 | 381 | 7.30 |
| 160 | (naphthyl) | 224–225 | 380 | 5.60 |
| 161 | (2-naphthyl) | 284–285 | 379 | 7.20 |

EXAMPLE 7

2.98 g of 2-(p-tolyl)-6-methyl-benzothiophene of formula (162)

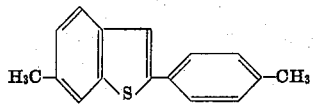

6.92 g of benzalaniline and 5.6 g of potassium tertiary-butylate are reacted in 150 ml of dimethylformamide for 1 hour in accordance with the information of Example 3: 4.7 g (90.7 % of theory) of 2-(stilben-4-yl)-6-styryl-benzothiophene of formula (163)

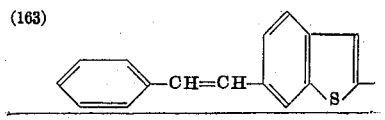

as a light yellow powder, melting point 335° to 336° C. Three-fold recrystallization from o-dichlorobenzene (active charcoal) yields 2.15 g (41.3 % of theory) of light greenish-tinged yellow glistening small needles of melting point 338° to 339° C.
Analysis: $C_{30}H_{22}S$. calculated: C 86.92, H 5.35, S 7.73; found: C 86.97, H 5.27, S 7.84.
UV-absorption in dimethylformamide: $\lambda_{max}$: 383 nm, $\epsilon \cdot 10^{-4}$: 8.30.

The stilbenyl-styryl-benzothiophene derivatives of formula (164)

R—CH=CH—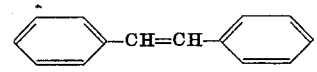—CH=CH—R listed in the table which follows can be manufactured in a similar manner.

| I | II | III | IV |
|---|---|---|---|
| | R | λ | ε·10⁻⁴ |
| 165 | 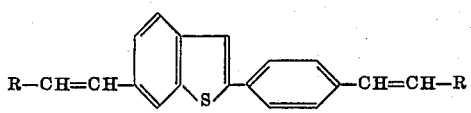 —CH(CH₃)₂ | 368–369 | 386 | 8.80 |
| 166 | —⬡—OCH₃ | 339–340 | 389 | 8.50 |

EXAMPLE 8

3.30 g of 2,5-di-(p-tolyl)-thiophene of formula (167)

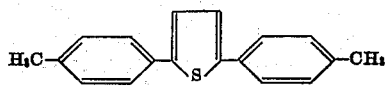

6.9 g of benzalaniline and 12.5 g of potassium hydroxide powder containing about 10 % of water are reacted in 150 ml of dimethylformamide for 1 hour at 90° to 95° C in accordance with the information of Example 2: 5.4 g (98.3 % of theory) of 2,5-di-(stilben-4'-yl)-thiophene of formula (168)

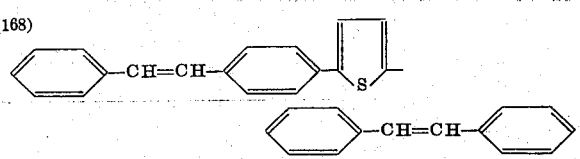

as a greenish-tinged yellow powder, melting point 344° to 345° C. Threefold recrystallization from o-dichlorobenzene (Fuller's earth) yields 3.75 g (68.2 % of theory) of greenish-tinged yellow fine small needles of melting point 346° to 347° C.
Analysis: $C_{32}H_{24}S$. calculated: C 87.23, H 5.49, S 7.38; found: C 87.03, H 5.47, S 7.36.
UV-absorption in dimethylformamide: $\lambda_{max}$: 397 nm, $\epsilon.10^{-4}$: 7.75.

The 2,5-distilbenyl-thiophene derivatives of formula (169)

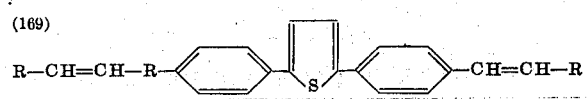

are listed in the table which follows can be manufactured in a similar manner.

| I | II | III | IV |
|---|---|---|---|
|   | R | λ | ε·10⁻⁴ |
| 170 | -⌬-CH(CH₃)CH₃ | 349-351 | 398 | 8.20 |
| 171 | naphthyl | 230-231 | 403 | 8.10 |

EXAMPLE 9

6.1 g of 2,7-dimethyl-thianthrene of formula (172)

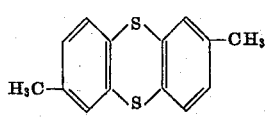

9.1 g of benzalaniline and 25 g of potassium hydroxide powder containing about 10 % of water are stirred with 300 ml of dimethylformamide with exclusion of air, warmed to 90° C over the course of 30 minutes and stirred for a further hour at 90° to 95° C. The mixture is cooled to room temperature, 250 ml of water and 100 ml of concentrated aqueous hydrochloric acid are successively added dropwise, and the precipitated reaction product is suction-filtered. After washing with 2 l of water and 500 ml of methanol, and drying: 9.5 g (90.5 % of theory) of 2,7-di-styryl-thianthrene of formula (173)

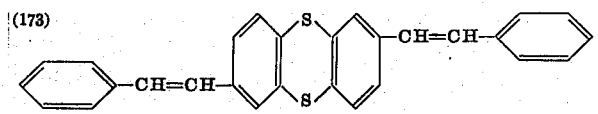

in the form of a yellow powder of melting point 242° to 244° C. After double recrystallization from tetrachloroethylene and thereafter from xylene (Fuller's earth): 6.0 g (57.1 % of theory) of yellow glistening platelets and small needles; melting point 258° to 258.5° C.
Analysis: $C_{28}H_{20}S_2$. calculated: C 79.96, H 4.79, S 15.25; found: C 79.83, H 4.62, S 15.15.
UV-absorption in dimethylformamide: $\lambda_{max}$: 329 nm, $\epsilon.10^{-4}$: 7.50.

The 2,7-di-styryl-thianthrene derivatives of formula (174)

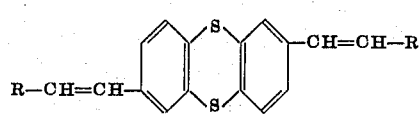

listed in the table which follows can be manufactured in a similar manner.

| I | II | III | IV |
|---|---|---|---|
|   | R | λ | ε·10⁻⁴ |
| 175 | -⌬-CH(CH₃)CH₃ | 223-224 | 335 | 8.25 |
| 176 | -⌬-OCH₃ | 270-271 | 343 | 8.0 |
| 177 | -⌬-⌬ | 359-360 | 350 | 11.0 |
| 178 | benzodioxole-CH₃ | 258-259 | 350 | 7.65 |
| 179 | naphthyl | 217-218 | 350 | 5.95 |
| 180 | naphthyl | 310-311 | 345 | 9.25 |

EXAMPLE 10

2.6 g of 2-(p-tolyl)-benzofurane of formula (181)

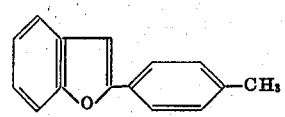

2.3 g of benzalaniline and 6.25 g of potassium hydroxide powder containing about 10 % of water are stirred with 100 ml of dimethylformamide with exclusion of air, warmed to 90° C over the course of 30 minutes and stirred for a further hour at 90° to 95° C. The mixture is cooled to room temperature, 100 ml of water and 70 ml of 10 % strength aqueous hydrochloric acid are successively added dropwise and the precipitated product is suction-filtered. After washing with 1 l of water and 150 ml of methanol and drying: 3.5 g (94.6 % of theory) of 2-(stilben-4'-yl)-benzofurane of formula (182)

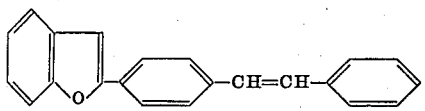

as a pale yellow powder, melting point 275° to 276° C. Three-fold recrystallization from xylene (active charcoal) yields 2.85 g (77.1 % of theory) of pale green glistening fine small needles of melting point 271° to 272° C.

Analysis: $C_{22}H_{16}O$. calculated: C 89.16, H 5.44, O 5.40; found: C 89.37, H 5.59, O 5.44, UV-absorption in dimethylformamide: $\lambda_{max}$: 355 nm, $\epsilon \cdot 10^{-4}$: 6.28.

The stilbenyl-benzofurane derivatives of formula (183)

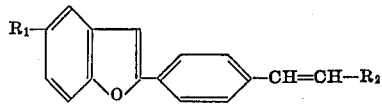

listed in the table which follows can be manufactured in a similar manner.

| I | II | | III | IV | |
|---|---|---|---|---|---|
| | $R_1$ | $R_2$ | | $\lambda$ | $\epsilon \cdot 10^{-4}$ |
| 184 | H | —⌬—OCH₃ | 284–285 | 363 | 6.50 |
| 185 | H | methylenedioxyphenyl | 261–262 | 367 | 6.48 |
| 186 | H | biphenyl | 339–340 | 368 | 7.80 |
| 187 | H | —⌬—N(C₂H₅)₂ | 227–227.5 | 400 | 5.04 |

| I | II | | III | IV | |
|---|---|---|---|---|---|
| | $R_1$ | $R_2$ | | $\lambda$ | $\epsilon \cdot 10^{-4}$ |
| 188 | H | naphthyl | 182–183 | 366 | 5.36 |
| 189 | H | naphthyl | 283–284 | 366 | 7.00 |
| 190 | —CH₃ | phenyl | 275–276 | 357 | 6.36 |

| I | II | III | IV | |
|---|---|---|---|---|
| | R | | $\lambda$ | $\epsilon \cdot 10^{-4}$ |
| 191 | —CH₃ | —⌬—OCH₃ | 288–289 | 364 | 6.80 |
| 192 | —CH₃ | biphenyl | 345–346 | 369 | 7.65 |
| 193 | —CH₃ | naphthyl | 209–210 | 366 | 5.36 |
| 194 | —CH₃ | naphthyl | 287–288 | 367 | 7.50 |
| 195 | —OCH₃ | phenyl | 267–268 | 360 | 6.24 |
| 196 | —OCH₃ | —⌬—OCH₃ | 286–287 | 367 | 6.80 |

| I | II | | III | IV | |
|---|---|---|---|---|---|
| | $R_1$ | $R_2$ | | $\lambda$ | $\epsilon \cdot 10^{-4}$ |
| 197 | —OCH₃ | biphenyl | 343–344 | 372 | 7.50 |
| 198 | —OCH₃ | naphthyl | 175–175.5 | 370 | 5.48 |
| 199 | —OCH₃ | naphthyl | 272–273 | 368 | 7.20 |
| 200 | —Cl | phenyl | 277–278 | 357 | 6.48 |
| 201 | —Cl | —⌬—OCH₃ | 306–307 | 365 | 6.50 |
| 202 | —Cl | biphenyl | 346–347 | 369 | 7.90 |
| 203 | —Cl | naphthyl | 196.5–197.5 | 365 | 5.40 |
| 204 | —Cl | naphthyl | 286–287 | 367 | 7.50 |
| 205 | —Br | —⌬—OCH₃ | 308–309 | 365 | 6.50 |

| I | II | | III | IV | |
|---|---|---|---|---|---|
| | $R_1$ | $R_2$ | | $\lambda$ | $\epsilon \cdot 10^{-4}$ |
| 206 | —Br | biphenyl | 349–350 | 369 | 7.95 |

| I | II | | III | IV |
|---|---|---|---|---|
| | R | | λ | ε·10⁻⁴ |
| 207 | —Br | (2-naphthyl) | 202.5–203.5 | 365 | 5.36 |
| 208 | —Br | (other naphthyl) | 291–292 | 367 | 7.60 |

| I | II | | III | IV |
|---|---|---|---|---|
| | R₁ | R₂ | λ | ε·10⁻⁴ |
| 209 | —CH₂—Ph | —Ph | 228–229 | 358 | 6.48 |
| 210 | —CH₂—Ph | —C₆H₄—OCH₃ | 259.5–260.5 | 365 | 6.60 |
| 211 | —CH₂—Ph | —biphenyl | 312–313.5 | 370 | 7.70 |

| I | II | | III | IV |
|---|---|---|---|---|
| | | | λ | ε·10⁻⁴ |
| 212 | —CH₃-phenyl | naphthyl | 201–202 | 367 | 5.40 |
| 213 | —CH₃-phenyl | naphthyl | 246–247 | 368 | 7.70 |

| I | II | | III | IV |
|---|---|---|---|---|
| | R₁ | R₂ | λ | ε·10⁻⁴ |
| 214 | —Ph | —Ph | 274–275 | 359 | 6.90 |
| 215 | Same | —C₆H₄—CH(CH₃)₂ | 272.5–273.5 | 362 | 7.28 |
| 216 | do | —C₆H₄—OCH₃ | 283–284 | 366 | 7.20 |
| 217 | do | benzodioxole-CH₃ | 271–272 | 362 | 7.28 |
| 218 | do | —biphenyl | 357–358 | 371 | 8.05 |
| 219 | do | naphthyl | 217–218 | 368 | 5.85 |
| 220 | do | naphthyl | 287–288 | 368 | 8.00 |

EXAMPLE 11

The stilbenyl-benzofurane derivatives of formula (221)

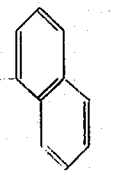

H₃C—(benzofuran)—O—C₆H₄—CH=CH—R listed in the table which follows can be manufactured from 2-(p-tolyl)-6-methyl-benzofurane in accordance with the information of Example 10.

| I | II | III | IV |
|---|---|---|---|
| | R | λ | ε·10⁻⁴ |
| 222 | —Ph | 241–242 | 359 | 5.76 |
| 223 | —C₆H₄—OCH₃ | 267–268 | 366 | 6.55 |

| I | II | III | IV | |
|---|---|---|---|---|
| | R | | λ | ε·10⁻⁴ |
| 224 | phenyl-phenyl | 314–315 | 371 | 7.55 |
| 225 | naphthyl | 156–156.5 | 370 | 5.20 |
| 226 | naphthyl | 269–270 | 369 | 7.00 |

EXAMPLE 12

The stilbenyl-benzofurane derivatives of formula

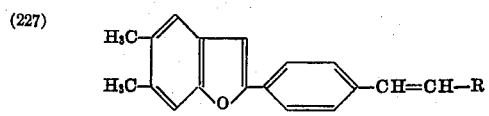

(227)

listed in the table which follows can be manufactured from 2-(p-tolyl)-5,6-dimethyl-benzofurane according to the information of Example 10.

| I | II | III | IV | |
|---|---|---|---|---|
| | R | | λ | ε·10⁻⁴ |
| 228 | phenyl | 265–266 | 361 | 6.08 |
| 229 | phenyl-OCH₃ | 275–276 | 367 | 6.56 |
| 230 | phenyl-phenyl | 329–330 | 374 | 7.60 |
| 231 | naphthyl | 203–204 | 373 | 5.00 |
| 232 | naphthyl | 304–305 | 371 | 7.00 |

EXAMPLE 13

The stilbenyl-benzofurane derivatives of formula

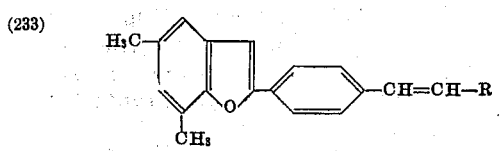

(233)

listed in the table which follows can be manufactured from 2-(p-tolyl)-5,7-dimethyl-benzofurane according to the information of Example 10.

| I | II | III | IV | |
|---|---|---|---|---|
| | R | | λ | ε·10⁻⁴ |
| 234 | phenyl | 186.5–187.5 | 358 | 6.08 |
| 235 | phenyl-OCH₃ | 246–247 | 365 | 6.48 |
| 236 | phenyl-phenyl | 259–260 | 371 | 7.55 |
| 237 | naphthyl | 147.5–148 | 367 | 5.24 |
| 238 | naphthyl | 191.5–192.5 | 368 | 6.80 |

EXAMPLE 14

The stilbenyl-benzofurane derivatives of formula

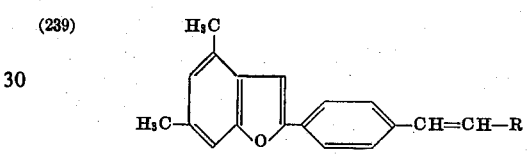

(239)

listed in the table which follows can be manufactured from 2-(p-tolyl)-4,6-dimethyl-benzofurane according to the information of Example 10.

| I | II | III | IV | |
|---|---|---|---|---|
| | R | | λ | ε·10⁻⁴ |
| 240 | phenyl | 144–145 | 363 | 5.20 |
| 241 | phenyl-OCH₃ | 188–189 | 369 | 5.84 |
| 242 | phenyl-phenyl | 236–237 | 375 | 6.50 |
| 243 | naphthyl | 215–215.5 | 371 | 6.86 |

EXAMPLE 15

The stilbenyl-benzofurane derivatives of formula

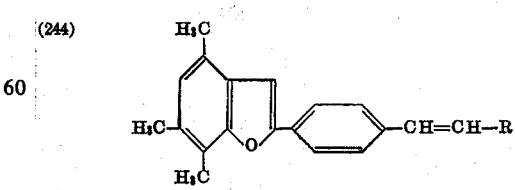

(244)

listed in the table which follows can be manufactured from 2-(p-tolyl)-4,6,7-trimethyl-benzofurane according to the information of Example 10.

| I | II | III | IV |
|---|---|---|---|
|  | R | λ | ε·10⁻⁴ |
| 245 | –⟨phenyl⟩ | 170–170.5 | 363 | 5.68 |
| 246 | –⟨phenyl⟩–OCH₃ | 213–214 | 368 | 6.00 |
| 247 | –⟨phenyl⟩–⟨phenyl⟩ | 238.5–239.5 | 375 | 7.12 |
| 248 | –⟨naphthyl-2⟩ | 209–210 | 374 | 5.00 |
| 249 | –⟨naphthyl-1⟩ | 210–211 | 372 | 6.48 |

EXAMPLE 16

The stilbenyl-naphthofurane derivatives of formula (250)

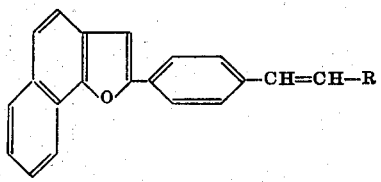

—CH=CH—R listed in the table which follows can be manufactured from 2-(p-tolyl)-naphtho-2',1':4,5-furane according to the information of Example 10.

| I | II | III | IV |
|---|---|---|---|
|  | R | λ | ε·10⁻⁴ |
| 251 | –⟨phenyl⟩ | 225–226 | 366 | 6.0 |
| 252 | –⟨phenyl⟩–OCH₃ | 244–245 | 372 | 6.8 |
| 253 | –⟨phenyl⟩–⟨phenyl⟩ | 289–290 | 377 | 7.75 |
| 254 | –⟨naphthyl-2⟩ | 228–229 | 377 | 5.45 |
| 255 | –⟨naphthyl-1⟩ | 263–264 | 375 | 7.20 |

EXAMPLE 17

The stilbenyl-naphthofurane derivatives of formula (256)

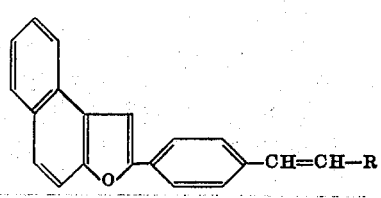

—CH=CH—R listed in the table which follows can be manufactured from 2-(p-tolyl)-naphtho-1', 2'-4,5-furane according to the information of Example 10.

| I | II | III | IV |
|---|---|---|---|
|  | R | λ | ε·10⁻⁴ |
| 257 | –⟨phenyl⟩ | 248–249 | 370 | 6.72 |
| 258 | –⟨phenyl⟩–CH(CH₃)₂ | 231–232 | 373 | 7.00 |
| 259 | –⟨phenyl⟩–Cl | 264–265 | 374 | 6.85 |
| 260 | –⟨phenyl⟩–OCH₃ | 275–276 | 376 | 7.10 |
| 261 | –⟨phenyl⟩–⟨phenyl⟩ | 316–317 | 381 | 8.15 |
| 262 | –⟨naphthyl-2⟩ | 205–205.5 | 380 | 6.00 |
| 263 | –⟨naphthyl-1⟩ | 296–297 | 379 | 7.60 |

EXAMPLE 18

5.21 g of 6-methyl-2-phenyl-benzofurane of formula (264)

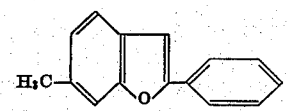

4.6 g of benzalaniline and 5.6 g of potassium tertiary-butylate are stirred with 150 ml of dimethylformamide with exclusion of air, warmed to 60° C over the course of 30 minutes and stirred for a further 1 hour at 60° to 65° C. The mixture is cooled to room temperature, 100 ml of water and 70 ml of 10 % strength aqueous hydrochloric acid are successively added dropwise and the precipitated reaction product is suction-filtered. After washing with 1 l of water and 200 ml of methanol and drying: 6.2 g (83.8 % of theory) of 6-styryl-2-phenyl-benzofurane of formula (265)

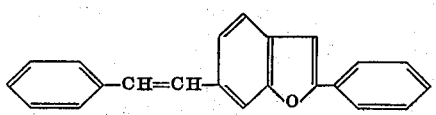

as a beige powder, melting point 195° to 195.5° C. After threefold recrystallization from xylene (active charcoal) 39 g (52.7 percent of theory) of colorless very fine small needles of melting point 196° to 196.5° C are obtained.

Analysis: $C_{22}H_{16}O$. Calculated: C 89.16, H 5.44, O 5.40; found: C 88.94, H 5.43, O 5.45.

UV-absorption in dimethylformamide: $\lambda_{max}$: 351 nm, $\varepsilon \cdot 10^{-4}$: 5.36.

The 6-styryl-2-phenyl-benzofurane derivatives of formula (266)

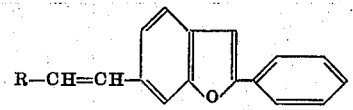

listed in the table which follows can be manufactured in a similar manner.

| I | II R | III λ | IV ε·10⁻⁴ |
|---|---|---|---|
| 267 | —⟨⟩—OCH₃ | 207–208 358 | 5.60 |
| 268 | —⟨⟩—⟨⟩ | 257–258 365 | 6.65 |
| 269 | (naphthyl) | 145–146 364 | 4.60 |
| 270 | (naphthyl) | 252–253 361 | 6.32 |

EXAMPLE 19

The 6-styryl-2,3-diphenyl-benzofurane derivatives of formula (271)

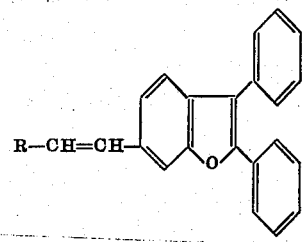

listed in the table which follows can be manufactured from 6-methyl-2,3-diphenyl-benzofurane according to the information of Example 18, with a reaction temperature of 90° to 95° C being maintained.

| I | II R | III λ | IV ε·10⁻⁴ |
|---|---|---|---|
| 272 | —⟨⟩ | 157–157.5 352 | 5.00 |
| 273 | —⟨⟩—OCH₃ | 171.5–172 358 | 5.08 |
| 274 | —⟨⟩—⟨⟩ | 233–234 365 | 6.48 |
| 275 | (naphthyl) | 189–189.5 361 | 5.88 |

EXAMPLE 20

The 4,6-distyryl-2-phenyl-benzofurane derivatives of formula (270)

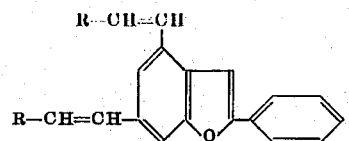

listed in the table which follows can be manufactured from 4,6-dimethyl-2-phenyl-benzofurane in accordance with the information of Example 18, using 50 % excess of the anil component and maintaining a reaction temperature of 90° to 95° C.

| I | II R | III λ | IV ε·10⁻⁴ |
|---|---|---|---|
| 277 | —⟨⟩ | 165.5–166.5 330 | 6.42 |
| 278 | —⟨⟩—OCH₃ | 138–138.5 340 | 7.20 |
| 279 | —⟨⟩—⟨⟩ | 236.5–237.5 351 | 9.20 |

EXAMPLE 21

The 5,6-distyryl-2-phenyl-benzofurane derivatives of formula (280)

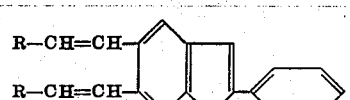

listed in the table which follows can be manufactured from 5,6-dimethyl-2-phenyl-benzofurane in accordance with the information of Example 18, using 50 % excess of the anil component and maintaining a reaction temperature of 90° to 95° C.

| I | II R | III λ | IV ε·10⁻⁴ |
|---|---|---|---|
| 281 | —⟨⟩ | 205.5–206 317 | 5.12 |
| 282 | —⟨⟩—OCH₃ | 202–202.5 325 | 6.40 |

EXAMPLE 22

15.52 g of 2-(p-tolyl)-4,5-diphenyl-furane of formula (283)

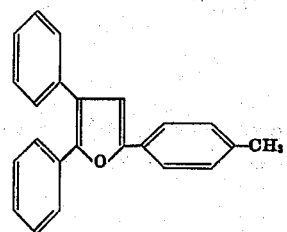

10.78 g of the anil of benzaldehyde and p-chloraniline and 25 g of potassium hydroxide powder containing about 10 % of water are reacted in 300 ml of dimethylformamide according to the information of Example 1: 16.5 g (82.8 % of theory) of 2-(stilben-4′-yl)-4,5-diphenyl-furane of formula (284)

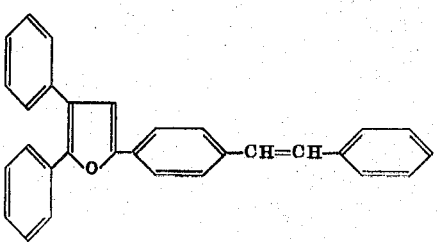

as a light yellow powder of melting point 186° to 187° C. Double recrystallization from tetrachlorethylene (Fuller's earth) and thereafter from xylene yields 11.1 g (56.8 % of theory) of pale greenish-tinged yellow fine crystals of melting point 188.5° C.
Analysis: $C_{30}H_{22}O$. calculated: C 90.42, H 5.57, O 4.02; found: C 90.60, H 5.43, O 4.10.
UV-absorption in dimethylformamide: $\lambda_{max}$: 370 nm, $\epsilon.10^{-4}$: 5.56.

The 2-stilbenyl-furane derivatives of formula (285)

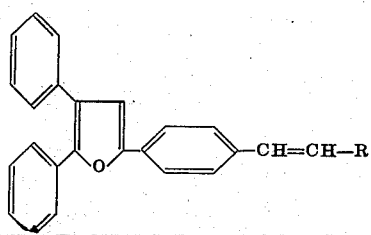

listed in the table which follows can be manufactured in a similar manner.

| I | II | III | IV |
|---|---|---|---|
|  | R | λ | ε·10⁻⁴ |
| 286 | —⌬—Cl | 204–204.5 | 373 | 5.68 |
| 287 | —⌬—OCH₃ | 230–231 | 375 | 6.24 |
| 288 | —⌬—⌬ | 261–262 | 380 | 6.80 |

EXAMPLE 23

The 2,5-distilbenyl-furane derivatives of formula (289)

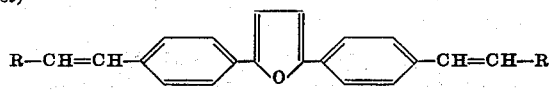

listed in the table which follows can be manufactured from 2,5-di-(p-tolyl)-furane according to the information in Example 8.

| I | II | III | IV |
|---|---|---|---|
|  | R | λ | ε·10⁻⁴ |
| 290 | —⌬ | 335–336 | 396 | 8.00 |
| 291 | —⌬—CH(CH₃)₂ | 319–320 | 398 | 8.45 |
| 292 | naphthyl | 220.5–221.5 | 405 | 7.70 |

EXAMPLE 24

The 2,5-distilbenyl-furane derivatives of formula (294)

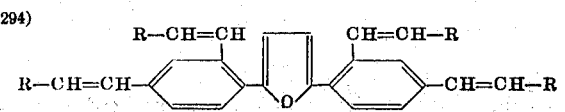

listed in the table which follows can be manufactured from 2,5-di-(2',4'-dimethyl-phenyl)-furane of formula (293)

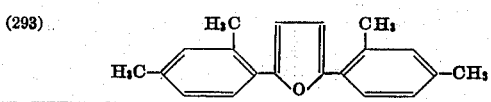

according to the information in Example 8.

| I | II | III | IV |
|---|---|---|---|
|  | R | λ | ε·10⁻⁴ |
| 295 | —⌬ | 169.5–170 | 399 | 5.40 |
| 296 | —⌬—OCH₃ | 212.5–213 | 403 | 5.90 |

EXAMPLE 25

A polyester woven fabric (for example "Dacron") is padded at room temperature (about 20° C) with an aqueous dispersion containing, per liter, 2 g of one of the compounds of formulas (106) and (113) as well as 1 g of an addition product of about 8 mols of ethylene oxide to 1 mol of p-tert. octyl-phenol, and is dried at about 100° C. The dry material is subsequently subjected to a heat treatment at 150° to 220° C, which lasts for between 2 minutes and a few seconds, depending on the temperature. The material treated in this way is of significantly whiter appearance than the untreated material.

EXAMPLE 26

100 parts of polyester granules of terephthalic acid ethylene glycol polyester are intimately mixed with 0.05 parts of one of the stilbene derivatives of formulas (186), (192), (197), (211), (218) and (236) and fused at 285° C with stirring. After spinning the spinning composition through conventional spinning nozzles strongly brightened polyester fibers are obtained.

The compounds mentioned above may also be added to the starting substances before or during the polycondensation to give the polyester.

EXAMPLE 27

10,000 parts of a polyamide manufactured in a known manner from hexamethylene diamine adipate, in chip form, are mixed with 30 parts of titanium dioxide (rutile modification) and 2 parts of the compound of formulas (186), (197) and (218) for 12 hours in a tumbler vessel. The chips which have been treated in this way are fused in a kettle heated to 300° – 310° C by means of oil or diphenyl vapor, after having displaced the atmospheric oxygen by superheated steam, and are stirred for half an hour. The melt is thereafter forced through a spinning nozzle under a nitrogen pressure of 5 atmospheres excess and the filament which has been spun in this way and cooled is wound on a spinning bobbin. The resulting filaments are optically brightened.

EXAMPLE 28

100 g of polypropylene "fiber grade" are intimately mixed with 0.02 g at a time of the compound of formula (102), (122), (186), (192), (197) or (218) and fused at 280° to 290° C while stirring. After spinning through conventional spinning nozzles and stretching, polypropylene fibers having a good brightening effect are obtained.

EXAMPLE 29

An intimate mixture of 100 parts of polyvinyl chloride, 3 parts of stabilizer (Advastat BD100; Ba/Cd complex), 2 parts of titanium dioxide, 59 parts of dioctyl phthalate and 0.01 to 0.2 parts of one of the compounds of formulas (105), (118) or (138) are rolled on a calender at 150° to 155° C to give a film. The opaque polyvinyl chloride film thus obtained has a significantly higher white content than a film which does not contain the optical brightener.

EXAMPLE 30

100 parts of polystyrene and 0.1 parts of one of the stilbene derivatives of formulas (113), (124) and (138) are fused for 20 minutes at 210° C in a tube of 1 cm diameter, with exclusion of air. After cooling an optically brightened polystyrene mass of good light fastness is obtained.

I claim:

1. Process for the manufacture of heterocyclic compounds containing at least one ethylene double bond conjugated with a carbocyclic aromatic six-membered ring, characterized in that a compound of the formula

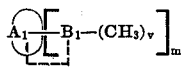

wherein $A_1$ represents a heterocyclic ring system which (a) contains one five-membered to six-membered heterocyclic ring having one ring oxygen atom, or one or two ring sulphur atoms as sole hetero ring atoms, (b) is free of ring nitrogen atoms and of hydrogen atoms which are replaceable by alkali metal, and (c) is bonded by a ring carbon atom to a ring carbon atom of $B_1$, or has two adjacent ring carbon atoms in common with two adjacent ring carbon atoms of $B_1$, and wherein furthermore (a) $B_1$ denotes a benzene ring, (b) $v$ denotes an integer from 1 to 2, and (c) wherein $m$ denotes an integer from 1 to 4 in the case of a single bond between $A_1$ and $B_1$, and denotes the numbers 1 or 2 in the case of rings $A_1$ and $B_1$ being condensed with one another, is reacted at a temperature about 10°–150° C in the presence of a strongly basic alkali compound with a Schiff base, wherein practically anhydrous dimethylformamide is used as the reaction medium and air is excluded, and wherein, in the case where alkali hydroxides are used as the strongly basic alkali compound, these alkali hydroxides may have a water content of up to 25%.

2. Process according to claim 1 for the manufacture of heterocyclic compounds containing at least one ethylene double bond conjugated with a carbocyclic aromatic six-membered ring, characterized in that a compound of the formula

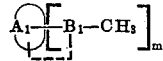

wherein $A_1$ represents a heterocyclic ring system which (a) contains one five-membered to six-membered heterocyclic ring having one ring oxygen atom or ring sulphur atom as sole hetero ring atoms, (b) is free of ring nitrogen atoms and of hydrogen atoms which are replaceable by alkali metal, and (c) is bonded by a ring carbon atom to a ring carbon atom of $B_1$ or has two adjacent ring carbon atoms in common with two adjacent ring carbon atoms of $B_1$, and wherein furthermore $B_1$ (a) denotes a benzene ring, (b) the methyl group according to the general formula is, in the case of a single bond between $A_1$ and $B_1$, in the para-position to this single bond and is, in the case of condensed ring systems $A_1$ and $B_1$, in the meta-position to the carbon atom of $B_1$ which is directly bonded to a ring oxygen atom or a ring sulphur atom of the ring system $A_1$, and (c) wherein m denotes an integer from 1 to 4 in the case of a single bond between $A_1$ and $B_1$ and denotes the numbers 1 or 2 in the case of rings $A_1$ and $B_1$ being condensed with one another, is reacted with a Schiff base as in claim 1.

3. Process according to claim 2 characterized in that a compound of the formula as defined in claim 2 is reacted in anhydrous dimethylformamide as the reaction medium in the presence of a strong alkaline potassium compound, with an aldehyde-anil as the Schiff base.

4. Process according to claim 2 characterized in that a compound of the formula

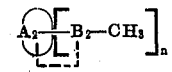

wherein $A_2$ represents a heterocyclic ring system which (a) contains a five-membered to six-membered heterocyclic ring having one ring oxygen atom or ring sulphur atom as sole hetero ring atoms, (b) is free of ring nitrogen atoms and of hydrogen atoms which are replaceable by alkali metal, and (c) is bonded by a ring carbon atom to a ring carbon atom of $B_2$ or has two adjacent ring carbon atoms in common with two adjacent ring carbon atoms of $B_2$, and wherein furthermore $B_2$ represents a benzene residue which (a) may contain a further condensed-on benzene residue and (b) whose methyl group according to the above formula is, in the case of a single bond between $A_2$ and $B_2$, in the paraposition to this single bond, and in the case of condensed ring systems between $A_2$ and $B_2$ in the meta-position to the carbon atom of $B_2$ which is directly bonded to a ring carbon atom or ring sulphur atom of the ring system $A_2$, and (c) wherein n represents the numbers 1 or 2, is reacted in anhydrous dimethylformamide as the reaction medium in the presence of a strongly alkaline potassium compound, with an aldehyde-anil.

5. Process according to Claim 1 characterized in that a compound of formula

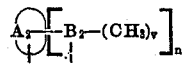

wherein $A_2$ represents a heterocyclic ring system which (a) contains a five-membered to six-membered heterocyclic ring having one to two ring oxygen atoms or ring sulphur atoms as sole hetero ring atoms, (b) is free of ring nitrogen atoms and of hydrogen atoms which are replaceable by alkali metal, and (c) is bonded by a ring carbon atom to a ring carbon atom of $B_2$ or has two adjacent ring carbon atoms in common with two adjacent ring carbon atoms of $B_2$, wherein furthermore $B_2$ represents a benzene residue and both v and also n represent the numbers 1 or 2, and wherein furthermore in the case of a single bond between $A_2$ and $B_2$, one of the methyl groups is preferably in the para-position to this single bond, and in the case of condensed ring systems between $A_2$ and $B_2$ is in the meta-position to the carbon atom of $B_2$ which is directly bonded to a ring oxygen atom or ring sulphur atom of the ring system $A_2$, is reacted in anhydrous dimethylformamide as the reaction medium in the presence of a strongly alkaline potassium compound, with an aldehyde-anil.

6. Process according to claim 2 characterized in that anils of aldehydes of aromatic character are reacted with compounds which correspond to the formula

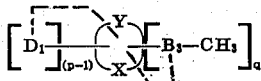

wherein $D_1$ denotes an aromatic, heterocyclic, cycloaliphatic, araliphatic or aliphatic non-chromophoric residue which (a) is free of hydrogen atoms which are replaceable by alkali metal and (b) should be free of methyl groups, the symbol

represents a five-membered to six-membered ring system which (a) can be bonded by single bonds both to $D_1$ and also to $B_3$, (b) can form condensed ring systems both with $D_1$ and also with $B_3$ (c) can form a condensed ring system with one of the residues $D_1$ or $B_3$ whilst the other residue is bonded by a single bond, and (d) together with $B_3$ (I) either contains at least one conjugated double bond in the case of linkage by a single bond or (II) in the case of condensed ring systems has a double bond in common with the condensed-on ring, wherein in this ring system X denotes a bridge member —O— or —S— and Y represents a member X or a direct bond, and the remaining ring members are formed by carbon atoms, $B_3$ represents an optionally substituted benzene residue whose methyl group, given in the formula, is, in the case of the benzene residue being linked by a single bond, in the para-position to this bond, and in the case of a condensed benzene residue is in the meta-position to the carbon atom of the benzene residue $B_3$ which is directly bonded to a ring oxygen atom or a ring sulphur atom of the condensed-on ring system

and wherein p represents an integer from 1 to 3 and q the numbers 1 or 2 and the sum p+q, in the case where both $D_1$ and $B_3$ are condensed with the ring system

at most represents the number 3 and in the case where only one of the two residues $D_1$ or $B_3$ is condensed, at most represents the number 4.

7. Process according to claim 2 characterized in that the reaction is carried out in the presence of an alkali compound having a base strength at least equal to that of lithium hydroxide, preferably potassium tertiary-butylate or potassium hydroxide, in dimethylformamide.

8. Process according to claim 2 characterized in that anils of aldehydes of aromatic character are reacted with compounds which correspond to the formula

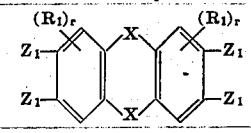

wherein X represents a bridge member —O— or —S—, $Z_1$ represents a hydrogen atom, a methyl group $R_1$, wherein however at least one of the symbols $Z_1$ denotes a methyl group which is in the meta-position to one of the symbols X and $R_1$ denotes hydrogen or a non-chromophoric substituent which is free of hydrogen atoms which are replaceable by alkali metal, or two symbols $R_1$ in the ortho-position can together form a carbocyclic condensed-on six-membered ring, and r denotes the numbers 1 or 2.

9. Process according to claim 2 characterized in that anils of aldehydes of aromatic character are reacted with compounds which correspond to the formula

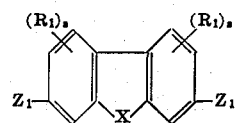

wherein X represents a bridge member —O— or —S— and $Z_1$ represents a hydrogen atom, a methyl group or a residue $R_1$, but at least one of the two symbols $Z_1$ represents a methyl group, $R_1$ denotes hydrogen or a non-chromophoric substituent which is free of hydrogen atoms which are replaceable by alkali metal, or two symbols $R_1$ in the ortho-position can together form a carbocyclic condensed-on six-membered ring, and s denotes an integer from 1 to 3.

10. Process according to claim 1 characterized in that anils of aldehydes of aromatic character are reacted with compounds which correspond to the formula

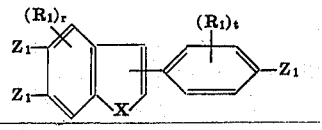

and wherein X denotes a bridge member —O— or —S—, $R_1$ denotes hydrogen or a non-chromophoric substituent which is free of hydrogen atoms which are replaceable by alkali metal or two symbols $R_1$ in the ortho-position can together from a carbo-cyclic condensed-on six-membered ring, $Z_1$ represents a hydrogen atom, a methyl group or a residue $R_1$ but at least one of the symbols $Z_1$ represents a methyl group, and methyl groups in the condensed ring system are to be in the meta-position to a bridge member —O— or —S— and r represents the number 1 or 2 and t represents an integer from 1 to 4.

11. Process according to claim 2 characterized in that anils of aldehydes of aromatic character are reacted with compounds which correspond to the formula

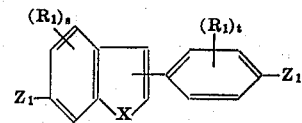

and wherein $Z_1$ represents a hydrogen atom, a methyl group or a residue $R_1$, but at least one of the two symbols $Z_1$ represents a methyl group, $R_1$ denotes a hydrogen or non-chromophoric substituent which is free of hydrogen atoms which are replaceable by alkali metal or two symbols $R_1$ in the ortho-position can together form a carbocyclic condensed-on six-membered ring, X represents a bridge member —O— or —S—, s denotes an integer from 1 to 3 and t denotes an integer from 1 to 4.

12. Process according to claim 1 characterized in that anils of aldehydes of aromatic character are reacted with compounds which correspond to the formula

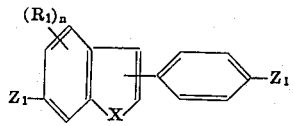

wherein X represents a bridge member —O— or —S—, $Z_1$ represents a hydrogen atom, a methyl group or a residue $R_1$ but at least one of the two symbols $Z_1$ represents a methyl group, $R_1$ denotes hydrogen, halogen, an alkyl or alkoxy group containing one to four carbon atoms, a benzyl group or phenyl group, or two symbols $R_1$ in the ortho-position can together form an aromatic carbocyclic condensed-on six-membered ring, and n denotes an integer from 1 to 2.

13. Process according to claim 2 characterized in that anils of aldehydes of aromatic character are reacted with compounds which correspond to the formula

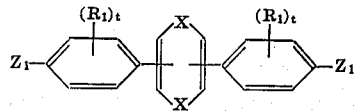

and wherein X represents a bridge member —O— or —S— and $Z_1$ represents a hydrogen atom, a methyl group or a residue $R_1$, but at least one of the two symbols $Z_1$ represents a methyl group, $R_1$ denotes hydrogen, alkyl, alkoxy, phenyl or halogen, or two symbols $R_1$ in the ortho-position can together form a carbocyclic condensed-on six-membered ring, and t represents an integer from 1 to 4.

14. Process according to claim 2 characterized in that anils of aldehydes of aromatic character are reacted with compounds which correspond to the formula

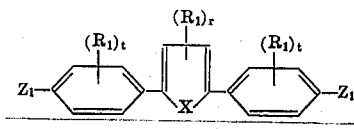

and wherein X represents a bridge member —O— or —S—, $Z_1$ represents hydrogen, a methyl group or a residue $R_1$, wherein however at least one of the two symbols $Z_1$ represents a methyl group, $R_1$ denotes hydrogen, alkyl, alkoxy, phenyl or halogen, or two symbols $R_1$ in the ortho-position can together form a carbocyclic condensed-on six-membered ring, t represents an integer from 1 to 4 and r denotes the number 1 or 2.

15. Process according to claim 2 characterized in that as the compound according to the formula in Patent claim 1, a compound is reacted which corresponds to the formula

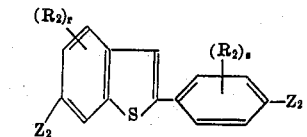

wherein $Z_2$ denotes a hydrogen atom or a methyl group, but at least one of the two symbols $Z_2$ represents a methyl group, $R_2$ denotes a hydrogen atom, a phenyl group, an alkyl group containing 2 to 12 carbon atoms, an alkoxy group containing one to four carbon atoms or a halogen atom, wherein r represents the number, 1 or 2 and s represents the numbers 1, 2 or 3 and the sum of r+s, in the case of substituents different from hydrogen, does not amount to more than 4 and wherein furthermore a maximum of two phenyl substituents may be present.

16. Process according to claim 1 characterized in that as the compound according to the formula in Patent claim 1, a compound is reacted which corresponds to the formula

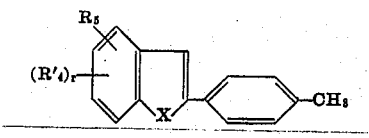

wherein $R_4'$ denotes a hydrogen atom, an alkyl group containing one to four carbon atoms, an alkoxy group containing one to four carbon atoms or halogen, or two adjacent residues $R_4'$ together may form a condensed-on benzene ring, $R_5$ denotes hydrogen, methyl, phenyl or benzyl, and r represents the numbers 1 or 2 and X represents a bridge member —O— or —S—.

17. Process according to claim 1 characterized in that as the compound according to the formula in Patent claim 1, a compound is reacted which corresponds to the formula

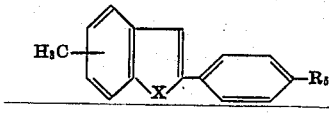

wherein $R_5$ represents hydrogen or phenyl and the methyl group given in the formula is preferably in positions 5 or 6 of the benzothiophene or benzofurane ring respectively, and X represents a bridge member —O— or —S—.

18. Process according to claim 2 characterized in that as the compound according to the formula of claim 1, compounds are reacted which correspond to the formula

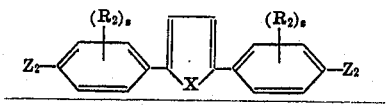

wherein $Z_2$ denotes a hydrogen atom or a methyl group, but at least one of the two symbols $Z_2$ represents a methyl group, X represents a bridge member —O— or —S—, $R_2$ denotes a hydrogen atom, a phenyl group, an alkyl group containing two to 12 carbon atoms, an alkoxy group containing one to four carbon atoms, or a halogen atom and s represents the numbers 1, 2 or 3.

19. Process according to claim 1 characterized in that as compounds according to the formula in claim 1, compounds are reacted which correspond to the formula

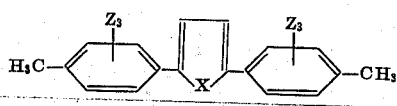

wherein the symbols $Z_3$ either both denote hydrogen or both represent a methyl group, and X represents a bridge member —O— or —S—.

20. Process according to claim 2 characterized in that as compounds according to the formula of claim 1, compounds are reacted which correspond to the formula

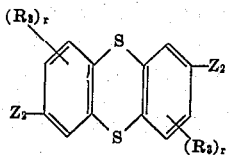

and wherein $Z_2$ denotes a hydrogen atom or a methyl group, but at least one of the two symbols $Z_2$ represents a methyl group, $R_3$ denotes a hydrogen atom, a halogen atom, an alkyl group containing two to four carbon atoms or a phenyl group and r represents the numbers 1 or 2.

21. Process according to Patent claim 2 characterized in that as compounds according to the formula of claim 1, compounds are reacted which correspond to the formula

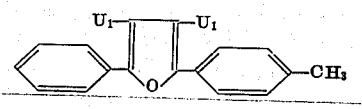

wherein $U_1$ represents a hydrogen atom, a phenyl group, an alkyl group containing two to four carbon atoms, an alkoxy group containing one to four carbon atoms or a halogen atom.

22. Process according to claim 2 characterized in that as compounds according to the formula of claim 1, compounds are reacted which correspond to the formula

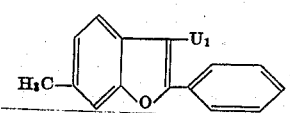

wherein $U_1$ represents a hydrogen atom, a phenyl group, an alkyl group containing two to four carbon atoms, an alkoxy group containing one to four carbon atoms or a halogen atom.

23. Process according to claim 1 characterized in that, as the compound according to the formula of Patent claim 1, a compound is reacted which corresponds to the formula

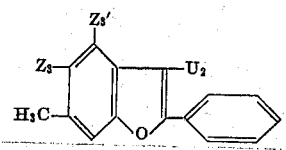

wherein $U_2$ represents hydrogen or phenyl and, of the symbols $Z_3$ and $Z_3'$, either both denote hydrogen or one of the two symbols $Z_3$ and $Z_3'$ represents the methyl group whilst the other denotes hydrogen.

24. Process according to claim 1 characterized in that a compound of formula

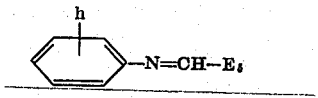

is used as the Schiff base, wherein h represents hydrogen or chlorine and $E_5$ represents phenyl, naphthyl, diphenylyl, thienyl or a phenyl residue which may be substituted by halogen, alkyl groups containing one to four carbon atoms, alkoxy groups containing one to four carbon atoms, alkylamino groups containing one to four carbon atoms or methylenedioxy groups.

25. Process according to claim 2 characterized in that an aldehyde-anil of formula

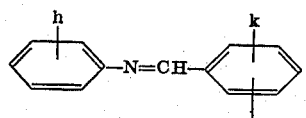

is used as the Schiff base, wherein k and l denote a hydrogen atom, a chlorine atom or a methoxy group or adjacent k and l together denote the group —O—CH₂—O— and h denotes a hydrogen atom or a chlorine atom.

26. Process according to claim 2 characterized in that an alkali metal compound of formula $$KOC_{m-1}H_{2m-1}$$

is used as the strongly basic alkali compound, wherein m denotes an integer having a value of at most 6.

27. A heterocyclic compound which corresponds to the formula

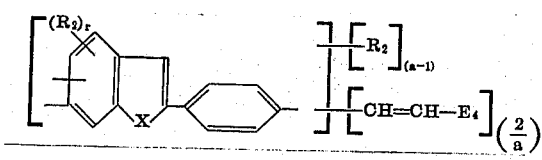

wherein $R_2$ denotes a hydrogen atom, a phenyl group, an alkyl group containing two to 12 carbon atoms, an alkoxy group containing one to four carbon atoms or a halogen atom, wherein r represents the numbers 1 or 2 and furthermore a maximum of one phenyl substituent may be present, wherein $E_4$ denotes a phenyl, naphthyl or thienyl residue which may contain further substituents of the group of halogen, alkyl, alkoxy with one to 18 carbon atoms in each case, phenyl or a methylenedioxy ring, a denotes the integers 1 or 2 and X represents a bridge member —O— or —S—.

28. A heterocyclic compound which corresponds to the formula

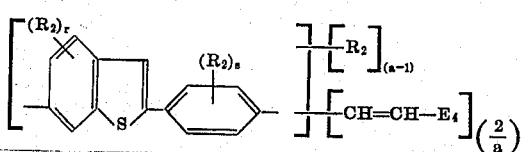

and wherein $R_2$ denotes a hydrogen atom, a phenyl group, an alkyl group containing two to 12 carbon atoms, an alkoxy group containing one to four carbon atoms or a halogen atom, wherein $r$ represents the numbers 1 or 2 and $s$ represents the numbers 1, 2 or 3 and the sum or $r+s$, in the case of substituents different from hydrogen, does not amount to more than 4 and furthermore at most two phenyl substituents may be present, wherein $E_4$ denotes a phenyl, naphthyl or thienyl residue which may contain further substituents of the group of halogen, alkyl, alkoxy, alkylamino with one to 18 carbon atoms in each case, phenyl or a methylenedioxy ring, and a denotes the integers 1 or 2.

29. A heterocyclic compound which corresponds to the formula

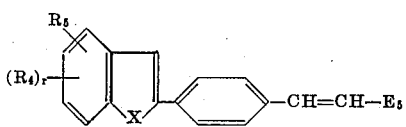

wherein $R_4$ denotes hydrogen, an alkyl group containing one to four carbon atoms, an alkoxy group containing one to four carbon atoms or halogen, $R_5$ denotes hydrogen, methyl, phenyl or benzyl, $r$ represents the numbers 1 or 2, $E_5$ denotes phenyl, naphthyl, diphenylyl, thienyl or a phenyl residue which may be substituted by halogen, alkyl groups containing one to four carbon atoms, alkoxy groups containing one to four carbon atoms or methylenedioxy groups, and X represents a bridge member —O— or —S—.

30. A heterocyclic compound which corresponds to the formula

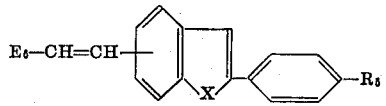

wherein $R_5$ represents hydrogen or phenyl and $E_6$ denotes phenyl, naphthyl, diphenylyl or a phenyl residue which may be substituted by halogen, alkoxy groups containing one to four carbon atoms or methylenedioxy groups, and X represents a bridge member —O— or —S—.

31. A heterocyclic compound which corresponds to the formula

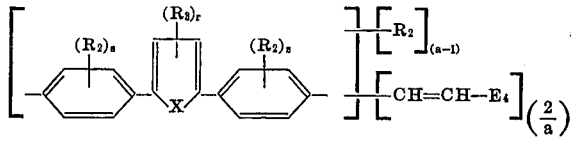

and wherein X denotes a bridge member —O— or —S—, $R_2$ denotes a hydrogen atom, a phenyl group, an alkyl group containing two to 12 carbon atoms, an alkoxy group containing one to four carbon atoms or a halogen atom, $R_3$ denotes a hydrogen atom, a halogen atom, an alkyl group containing two to four carbon atoms or a phenyl group, $r$ represents the numbers 1 or 2 and $s$ represents the numbers 1, 2 or 3, wherein $E_4$ denotes a phenyl, naphthyl or thienyl residue which may contain further substituents of the group of halogen, alkyl, alkoxy, alkylamino with one to 18 carbon atoms in each case, phenyl or methylenedioxy ring, and and a denotes the integers 1 or 2.

32. A heterocyclic compound which corresponds to the formula

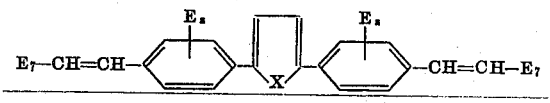

wherein $E_7$ denotes phenyl, naphthyl or a phenyl group which is substituted by alkyl groups or alkoxy groups containing one to four carbon atoms, $E_z$ represents hydrogen or —CH=CH—$E_7$ and X denotes a bridge member —O— or —S—.

33. A heterocyclic compound which corresponds to the formula

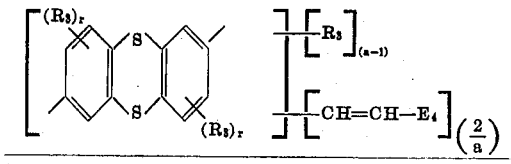

and wherein $R_3$ denotes a hydrogen atom, a halogen atom, an alkyl group containing two to four carbon atoms or a phenyl group, and r represents the numbers 1 or 2, wherein $E_4$ denotes a phenyl, naphthyl or thienyl residue which may contain further substituents of the group of halogen, alkyl, alkoxy, alkylamino with one to 18 carbon atoms in each case, phenyl or a methylenedioxy ring, and a denotes the integers 1 or 2.

34. A heterocyclic compound which corresponds to the formula

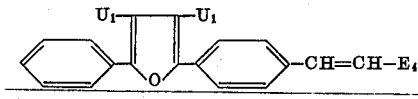

and wherein $E_4$ denotes a phenyl, naphthyl or thienyl residue which may contain further substituents of the group of halogen, alkyl, alkoxy, alkylamino with one to 18 carbon atoms in each case, phenyl or a methylenedioxy ring, wherein furthermore $U_1$ represents a hydrogen atom, a phenyl group, an alkyl group containing two to four carbon atoms, an alkoxy group containing one to four carbon atoms or a halogen atom.

35. A heterocyclic compound which corresponds to the formula

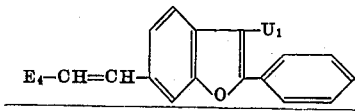

and wherein $E_4$ denotes a phenyl, naphthyl or thienyl residue which may contain further substituents of the group of halogen, alkyl, alkoxy, alkylamino with one to 18 carbon atoms in each case, phenyl or a methylenedioxy ring, and wherein $U_1$ represents a hydrogen atom, a phenyl group, an alkyl group containing two to four carbon atoms, an alkoxy group containing one to four carbon atoms or a halogen atom.

36. A heterocyclic compound which corresponds to the formula

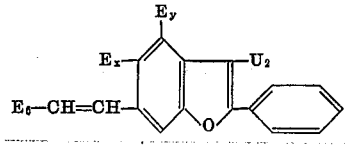

wherein $U_2$ represents hydrogen or phenyl, $E_6$ denotes phenyl, diphenylyl, naphthyl or a phenyl group substituted by alkoxy groups containing one to four carbon atoms, and $E_x$ and $E_y$ either both denote hydrogen or one of the symbols $E_x$ and $E_y$ represents a group $E_6$—CH=CH— whilst the other denotes hydrogen.

37. A heterocyclic compound which corresponds to the formula

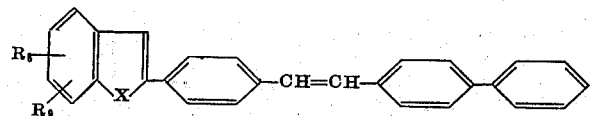

wherein X denotes a bridge member —O— or —S—, $R_8$ represents hydrogen, alkyl having one to four carbon atoms, halogen, alkoxy having one to four carbon atoms, benzyl or phenyl, and $R_9$ represents hydrogen or a methyl group.

38. A heterocyclic compound which corresponds to the formula

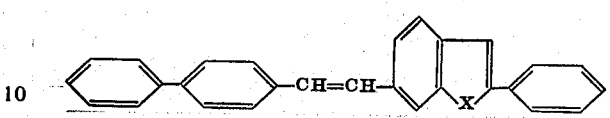

wherein X denotes a bridge member —O— or —S—.

39. A compound according to claim 38, wherein X stands for O.

* * * * *